United States Patent
Tabuchi et al.

(10) Patent No.: US 6,372,065 B1
(45) Date of Patent: Apr. 16, 2002

(54) APPARATUS AND METHOD FOR PRODUCING PHOTOGRAPHIC ROLL FILM

(75) Inventors: Masaharu Tabuchi; Yukio Seto; Taro Yamamoto, all of Minamiashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/515,851

(22) Filed: Feb. 29, 2000

(30) Foreign Application Priority Data

| Mar. 2, 1999 | (JP) | 11-054433 |
| Mar. 2, 1999 | (JP) | 11-054439 |
| Mar. 2, 1999 | (JP) | 11-054450 |
| Mar. 2, 1999 | (JP) | 11-054456 |
| Dec. 15, 1999 | (JP) | 11-355556 |

(51) Int. Cl.[7] .......................... B32B 31/08; G03C 3/02
(52) U.S. Cl. .................. 156/64; 156/191; 156/192; 156/256; 156/277; 156/350; 156/351; 156/459; 156/519; 242/444
(58) Field of Search .......................... 156/64, 184, 190, 156/191, 192, 256, 277, 324, 350, 353, 354, 387, 384, 351, 459, 510, 517, 519

(56) References Cited

U.S. PATENT DOCUMENTS 3,570,778 A * 3/1971 Bushnell
6,079,654 A * 6/2000 Sasou et al.
6,159,326 A * 12/2000 Shigetaa et al. ............ 156/256
6,196,484 B1 * 3/2001 Hosaka et al.

FOREIGN PATENT DOCUMENTS

| EP | 0 828 186 | * 3/1998 |
| EP | 0 892 300 | * 1/1999 |
| JP | 10-1048803 | * 4/1998 |
| JP | 10-161278 | * 6/1998 |
| JP | 10-171072 | * 6/1998 |

* cited by examiner

Primary Examiner—Curtis Mayes
(74) Attorney, Agent, or Firm—Sughrue Mion, PLLC

(57) ABSTRACT

Disclosed are a method and an apparatus comprising a film-cutting means for cutting a lengthy photographic film fed from a film roll into those having a length suitable for a film size included in film information, a conveyer apparatus for changing transport operation for a photographic film strip depending on the film size, a timing-changing means for changing transport timing for the photographic film strip to be fed to a winding section depending on the film size, and a timing-changing means for changing transport timing for a shield paper strip to be fed to the winding section depending on the film size.

46 Claims, 16 Drawing Sheets

APPARATUS AND METHOD FOR PRODUCING PHOTOGRAPHIC ROLL FILM

BACKGROUND OF THE INVENTION

1. Field of the Invention

The present invention relates to an apparatus and a method for producing photographic roll films, which make it possible to produce at least two types of photographic roll films having different sizes.

2. Description of the Related Art

In general, the photographic roll film is classified into several types including those called the 120 type and the 220 type. The 120 type photographic roll film comprises a spool, a photographic film strip wound around the spool, a shield paper strip wound around the spool together with the photographic film strip to serve as the back side paper for the photographic film strip, an adhesive tape for fixing the forward end of the product (rearward end during the production) of the photographic film strip to the shield paper strip, an opening seal wound around the outer circumference of the shield paper strip to avoid any winding looseness of the photographic film strip and the shield paper strip wound around the spool, and an enclosing seal for being used to avoid any winding looseness of the photographic film strip and the shield paper strip wound around another spool after the photographing operation.

The photographic film strip, which is used for the 120 type photographic roll film, has a length capable of photographing 12 frames in the case of the 6 cm×6 cm format, a length capable of photographing 8 frames in the case of the brownie size 6 cm×9 cm format, or a length capable of photographing 16 frames in the case of the half size 6 cm×4.5 cm format.

Another photographic roll film of the half size type also exists, which has the same structure as that of the ordinary 120 type photographic roll film, provided that the lengths of the photographic film strip and the shield paper strip are about the half of those of the ordinary 120 type photographic roll film, making it possible to perform the photographing operation for 8 frames with the half size 6 cm×4.5 cm format.

The 220 type photographic roll film is constructed in approximately the same manner as the 120 type except for the following points. That is, the back side paper is avoided, a leader and a trailer, which are made of the same material as that of the shield paper strip, are attached to the forward end and the rearward end of the photographic film strip. Thus, the photographic film strip, which is wound around the spool, is allowed to have a long size to increase the number of photographing frames.

The film information concerning the photographic film strip wound around the spool is previously printed on the shield paper strip, the opening seal, and the enclosing seal.

The film information includes the information indicating whether the photographic roll film is of the 120 type or the 220 type, the film size indicating whether the length of the photographic film strip is the full size or the half size, the ISO sensitivity, the film type indicating whether the photographic film strip is color or black-and-white and whether the photographic film is negative or reversal if the photographic film is color, and the treatment number indicating the development treatment method.

The film information and the serial number for indicating the production information such as the lot number and the processing sequence are side-printed on the photographic film strip during the production of the photographic roll film. The serial number is also printed on the opening seal during the production of the photographic roll film.

It has been suggested that any coded information indicating the classification of the 120 type and the 220 type is previously printed on the adhesive tape together with the film information. When the photographic roll film is charged in a camera to be used, a bar code of the adhesive tape is read by a bar code reader of the camera to be utilized. According to this technique, it is possible to automate various setting operations such as setting of the film sensitivity and the number of photographing frames and switching of the pressure plate, which have been hitherto performed by the manual operation.

However, the conventional production apparatus adopts the system for producing the photographic roll film concerning one size, for example, the full size. For this reason, when the photographic roll films concerning two or more sizes are produced, it is necessary that the production apparatuses are installed for the respective sizes. It is feared that the production equipment becomes large, the installation space is increased, and there is any limit of the reduction of the production cost.

SUMMARY OF THE INVENTION

The present invention has been made taking the foregoing problems into consideration, an object of which is to provide an apparatus and a method for producing photographic roll films, which make it possible to produce photographic roll films concerning two or more sizes in a switching manner with ease, realize a small size of the production equipment, reduce the installation space, and reduce the production cost.

According to the present invention, there is provided an apparatus for producing photographic roll films, comprising a film supply section for supplying a photographic film strip, a shield paper supply section for supplying a shield paper strip, a winding section for winding the photographic film strip and the shield paper strip around a spool, and a transport system for transporting the photographic film strip to the winding section; wherein the film supply section includes a film-cutting means for cutting a lengthy photographic film fed from a film roll into those having a length suitable for a film size included in film information; the apparatus further comprises a transport operation-changing means for changing transport operation for the photographic film strip depending on the film size, between the film supply section and the transport system for the photographic film strip; and the apparatus further comprises a timing-changing means for changing transport timing depending on the film size, for the transport system for the photographic film strip and a transport system for the shield paper strip.

Accordingly, at first, the lengthy photographic film, which is fed from the film roll, is cut into those having the length suitable for the film size included in the film information, by means of the film-cutting means.

Subsequently, the transport operation-changing means, which is installed between the film supply section and the transport system for the photographic film strip, is used to change the transport operation for the photographic film strip depending on the film size.

The timing-changing means changes the transport timing for the photographic film strip and the transport timing for the shield paper strip to be transported to the winding section depending on the film size.

In other words, in the present invention, the cutting is performed to give the photographic film strip suitable for the film size included in the film information. The transport operation for the photographic film strip is also changed depending on the film size. Further, the transport timing for the photographic film strip and the transport timing for the shield paper strip to be transported to the winding section are changed depending on the film size.

Therefore, in the present invention, the photographic roll films concerning two or more sizes can be easily produced in a switching manner. Thus, it is possible to realize a small scale of the production equipment, reduce the installation space, and reduce the production cost.

It is preferable that the film-cutting means cuts the lengthy photographic film on the basis of a start signal corresponding to the film size supplied from a start signal-generating means to give a photographic film strip having a length suitable for a current film size.

In this arrangement, the start signal-generating means may include an origin signal-generating means for generating a plurality of origin signals corresponding to the film sizes; and a selector section for selecting an origin signal corresponding to the current film size, of the plurality of origin signals supplied from the origin signal-generating means so that the selected origin signal is outputted as a start signal.

The origin signal-generating means may include a power transmission mechanism for being driven by a driving source of a driving motor for a suction drum for transporting the lengthy photographic film supplied from the film roll while allowing the lengthy photographic film to make tight contact by the aid of suction of air; the power transmission mechanism being operated such that driving force of the driving motor is transmitted to each of circular plates of a number corresponding to types of the film size to be included in the film information so that each of the corresponding circular plates is rotated to make one turn when the lengthy photographic film is transported in an amount of a length corresponding to each the film sizes; and sensors attached to the respective circular plates, each of which outputs a detection signal when each of the corresponding circular plates is rotated to make one turn.

On the other hand, it is also preferable that the transport operation-changing means changes the transport operation for the photographic film strip so that low speed transport for the photographic film strip is performed only when the photographic film strip is cut, irrelevant to the film size.

Accordingly, it is possible to decrease the difference in linear speed with respect to the belt when the photographic film strip is stopped to cut the photographic film strip. Thus, it is possible to perform the transport without deteriorating the quality of the film. Further, it is possible to obtain an approximately constant speed of the feed of the photographic film strip to the winding section, regardless of the length of the photographic film strip. Thus, it is possible to efficiently produce the photographic film strips having different sizes.

In this arrangement, it is also preferable that the transport operation-changing means includes at least two conveyer apparatuses; a length of the upstream side conveyer apparatus of the conveyer apparatuses is set to be substantially the same as a length of the shortest photographic film strip; and a total length of the conveyer apparatuses for constructing the transport operation-changing means is substantially the same as a length of the longest photographic film strip.

It is preferable that when each of the conveyer apparatuses is of a type to transport the photographic film strip while nipping it with an upper conveyer and a lower conveyer; a downstream side roller of the upper conveyer of the upstream side conveyer apparatus is positioned over an upstream side roller of the lower conveyer of the downstream side conveyer apparatus.

The timing-changing means may include a first sensor installed in the transport system for the photographic film strip, for detecting a forward end of the photographic film strip irrelevant to the film size to output a signal to facilitate once-stop; a second sensor installed in the transport system for the photographic film strip, for detecting a forward end of the shortest photographic film strip to output a signal to facilitate once-stop; a cutter installed in the transport system for the shield paper strip to be fed to the winding section, for once-stopping the shield paper strip to cut it into those having a prescribed length; and a sensor installed in the transport system for the shield paper strip, for detecting a forward end inclined section of the shield paper strip corresponding to the shortest photographic film strip to output a signal to facilitate once-stop.

It is preferable that an appearance-inspecting means for inspecting appearance of the spool is installed in a station disposed at an upstream stage of a station for winding the photographic film strip and the shield paper strip around the spool, of a plurality of stations for constructing the winding section.

According to another aspect of the present invention, there is provided an apparatus for producing photographic roll films, comprising a film supply section for supplying a photographic film strip, a shield paper supply section for supplying a shield paper strip, a winding section for winding the photographic film strip and the shield paper strip around a spool, and a transport system for transporting the photographic film strip to the winding section; wherein the film supply section includes a feed control apparatus for a lengthy photographic film as an original sheet for the photographic film strip; and the feed control apparatus includes a rotation control means for calculating a winding diameter of a film roll on the basis of a number of revolution of a driving motor obtained when the lengthy photographic film is fed in a predetermined length corresponding to a preset film size from the film roll with the lengthy photographic film wound therearound, and calculating a number of revolution to be used to feed the lengthy photographic film in the predetermined length within a predetermined period of time on the basis of the winding diameter so that the number of revolution is used as a corrected number of revolution; and a motor control means for making feedback control so that the number of revolution of the driving motor is changed to the corrected number of revolution within a predetermined period of time, while comparing the corrected number of revolution supplied from the rotation control means with a current number of revolution of the driving motor.

Accordingly, at first, the rotation control means is used to calculate the winding diameter of the film roll on the basis of the number of revolution of the driving motor when the lengthy photographic film is fed in the predetermined length from the film roll. The number of revolution, which is used to feed the lengthy photographic film in the predetermined length within the predetermined period of time, is calculated on the basis of the obtained winding diameter, and the obtained number of revolution is used as the corrected number of revolution.

The motor control means disposed at the downstream stage is used to make the feedback control so that the number of revolution of the driving motor becomes the corrected number of revolution within the predetermined period of time, while comparing the corrected number of revolution fed from the rotation control means with the current number of revolution of the driving motor.

In this arrangement, the lengthy photographic film can be continuously fed by rotating the film roll at the number of revolution corresponding to the winding diameter of the film roll. Thus, it is possible to efficiently feed the lengthy photographic film to the transport system disposed at the downstream stage.

The rotation control means is used such that the winding diameter of the film roll is calculated on the basis of the predetermined length corresponding to the film size to determine the corrected number of revolution corresponding to the winding diameter. Therefore, the lengthy photographic film can be fed from the film roll at the optimum number of revolution in conformity with the type of the photographic film strip to be manufactured.

Therefore, according to the apparatus for producing photographic roll films concerning the present invention, the photographic roll films concerning the two or more sizes can be easily produced in a switching manner. It is possible to realize a small scale of the production equipment, reduce the installation space, and reduce the production cost.

The rotation control means may include a winding diameter-calculating means for calculating the winding diameter of the film roll on the basis of the number of revolution of the driving motor when the lengthy photographic film is fed in the predetermined length from the film roll; and a number of revolution-correcting means for calculating the number of revolution for the lengthy photographic film to be fed in the predetermined length within the predetermined period of time on the basis of winding diameter information fed from the winding diameter-calculating means to make output as the corrected number of revolution.

In this arrangement, the winding diameter-calculating means may include a number of revolution-detecting means for detecting the number of revolution of the driving motor for driving and rotating the film roll; a feed amount-detecting means for detecting a feed amount of the lengthy photographic film from the film roll effected by the rotary driving of the motor; a film length-detecting section for comparing information fed from the feed amount-detecting means with the predetermined length to measure a period of time during which the lengthy photographic film is fed in the predetermined length; a number of revolution-counting section for counting the number of revolution of the motor over the period of time of the measurement performed by the film length-detecting section; and a winding diameter-calculating section for calculating a current winding diameter of the film roll on the basis of a counted value fed from the number of revolution-counting section and a value corresponding to the predetermined length.

Those usable as the number of revolution-detecting means include an encoder for making conversion and output of an electric signal having a number of pulses corresponding to the number of revolution of the driving motor, and a sensor for outputting a detection signal when a circular plate attached to a driving shaft is rotated to make one turn.

The production apparatus of the present invention may further comprise a roller for guiding the lengthy photographic film fed from the film roll to a transport line disposed at a downstream stage; wherein an encoder for making conversion and output of an electric signal having a number of pulses corresponding to the number of revolution of the roller may be used as the feed amount-detecting means.

Alternatively, the apparatus may further comprise a dancer roller for absorbing feed of the lengthy photographic film caused by transport stop of the lengthy photographic film as a result of cutting of the lengthy photographic film; wherein an electronic component for making conversion and output of an electric signal having a level corresponding to a movement distance of the dancer roller is used as the feed amount-detecting means.

According to still another aspect of the present invention, there is provided an apparatus for producing photographic roll films, comprising a film supply section for supplying a photographic film strip, a shield paper supply section for supplying a shield paper strip, a winding section for winding the photographic film strip and the shield paper strip around a spool, and a transport system for transporting the photographic film strip to the winding section; wherein the apparatus further comprises a printing apparatus for printing various information on the photographic film strip; and the printing apparatus starts printing on the basis of input of a start signal corresponding to a film size fed from a start signal-generating means, and it performs printing on the photographic film strip in accordance with inputted printing data.

Accordingly, the information based on the printing data can be correctly and easily printed on a portion of the photographic film strip corresponding to the current film size.

As a result, when the apparatus for producing photographic roll films according to the present invention is used, it is possible to easily produce the photographic roll films concerning two or more sizes in a switching manner. It is possible to realize a small scale of production equipment, reduce the installation space, and reduce the production cost.

The start signal-generating means may include an origin signal-generating means for generating a plurality of origin signals corresponding to the film sizes; and a selector section for selecting an origin signal corresponding to a current film size, of the plurality of origin signals supplied from the origin signal-generating means so that the selected origin signal is outputted as a start signal.

In this arrangement, the origin signal-generating means may include a power transmission mechanism for being driven by a driving source of a driving motor for a suction drum for transporting the photographic film strip while allowing the photographic film strip to make tight contact by the aid of suction of air; the power transmission mechanism being operated such that driving force of the driving motor is transmitted to each of circular plates of a number corresponding to types of the film size to be included in the film information so that each of the corresponding circular plates is rotated to make one turn when the photographic film strip is transported in an amount of a length corresponding to each the film sizes; and sensors attached to the respective circular plates, each of which outputs a detection signal when each of the corresponding circular plates is rotated to make one turn.

The origin signal-generating means may include a first origin signal-generating means for generating a first origin signal for a full size, and a second origin signal-generating means for generating a second origin signal for a half size.

In this arrangement, the first origin signal-generating means may include a first pulley fixed to a rotary shaft of the driving motor for rotating and driving the suction drum; a second pulley to which rotary driving of the first pulley is transmitted by the aid of a belt; and the first circular plate for making rotation together with the second pulley. The second origin signal-generating means may include a third pulley fixed to a rotary shaft of the driving motor for rotating and driving the suction drum; a fourth pulley to which rotary driving of the third pulley is transmitted by the aid of a belt; and the second circular plate for making rotation together with the fourth pulley.

The origin signal-generating means may include a first decelerator having an input/output ratio of full size film length/full size film length coupled to a rotary shaft of a driving motor of a suction drum; a second decelerator having an input/output ratio of full size film length/full size film length coupled to the first decelerator via a belt drive system; a second circular plate coupled to a rotary shaft of the second decelerator; a third decelerator having an input/output ratio of full size film length/half size film length coupled to the second circular plate; and a first circular plate coupled to a rotary shaft of the third decelerator.

According to still another aspect of the present invention, there is provided an apparatus for producing photographic roll films, comprising a film supply section for supplying a photographic film strip, a shield paper supply section for supplying a shield paper strip, a winding section for winding the photographic film strip and the shield paper strip around a spool, and a transport system for transporting the photographic film strip to the winding section; wherein the apparatus further comprises a transport apparatus for sticking a tape member such as an adhesive tape to the photographic film strip; the transport apparatus includes a plurality of transport roller pairs corresponding to types of film sizes, installed at a transport passage disposed at a downstream stage of a tape-sticking section for sticking the tape; and the apparatus further comprises a control means for making control to successively select a plurality of preset transport roller pairs of the plurality of transport roller pairs corresponding to the film size so that any one of the transport roller pair of the plurality of successively selected transport roller pairs is used to transport the photographic film strip.

Accordingly, at first, the control means successively selects the plurality of preset transport roller pairs corresponding to the film size, of the plurality of transport roller pairs. In this arrangement, the photographic film strip is not transported by the plurality of transport roller pairs, but the photographic film strip is transported by one transport roller pair.

For example, the photographic film strip is transported by the transport roller pair disposed nearest to the tape-sticking section at the stage at which the forward end of the photographic film strip passes through the tape-sticking section. The tape is stuck to the photographic film strip at the tape-sticking section at the stage at which the forward end of the photographic film strip arrives at the transport roller pair corresponding to the film size of the photographic film strip. After that, the photographic film strip is transported to the downstream process steps by the transport roller pair corresponding to the film size of the photographic film strip, not by the transport roller pair disposed nearest to the tape-sticking section.

As described above, according to the apparatus for producing photographic roll films concerning the present invention, the photographic roll films concerning two or more sizes can be easily produced in a switching manner. Thus, it is possible to realize a small scale of the production equipment, reduce the installation space, and reduce the production cost.

When the apparatus constructed as described above is adapted to a full size and a half size of the photographic film strip, first to third transport roller pairs are installed. When the photographic film strip to be stuck with the tape is of the full size, the control means successively selects the first transport roller pair disposed nearest to the tape-sticking section and the third transport roller pair disposed furthest from the tape-sticking section depending on a transport state of the photographic film strip so that the photographic film strip is transported by any one of the transport roller pair of the first and third transport roller pairs.

In other words, when the photographic film strip is of the full size, the control means successively selects the first transport roller pair and the third transport roller pair. In this process, the photographic film strip of the full size is transported by the first transport roller pair at the stage at which the forward end of the photographic film strip passes through the tape-sticking section. The tape is stuck to the photographic film strip at the tape-sticking section at the stage at which the forward end of the photographic film strip arrives at the third transport roller pair. After that, the photographic film strip is transported to the process steps disposed at the downstream stage by the aid of the third transport roller pair.

When the photographic film strip to be stuck with the tape is of the half size, the control means successively selects the first to third transport roller pairs depending on a transport state of the photographic film strip so that the photographic film strip is transported by any one of the transport roller pair of the first to third transport roller pairs.

In other words, when the photographic film strip is of the half size, the control means successively selects the first to third transport roller pairs. In this process, the photographic film strip of the half size is transported by the first transport roller pair at the stage at which the forward end of the photographic film strip passes through the tape-sticking section. The tape is stuck to the photographic film strip at the tape-sticking section at the stage at which the forward end of the photographic film strip arrives at the second transport roller pair. After that, the photographic film strip is transported by the second transport roller pair. At the stage at which the forward end of the photographic film strip arrives at the third transport roller pair, the photographic film strip is in turn transported by the third transport roller pair to the process steps disposed at the downstream stage.

The apparatus constructed as described above may further comprise a first sensor installed in the vicinity of the third transport roller pair, for detecting a forward end of the photographic film strip irrelevant to the film size to output a signal to facilitate once-transport stop; and a second sensor installed in the vicinity of the second transport roller pair, for detecting a forward end of the photographic film strip of the half size to output a signal to facilitate once-transport stop; wherein the tape-sticking section sticks the tape member to the photographic film strip, i.e., to the photographic film strip of the full size on the basis of the output of the signal from the first sensor, or to the photographic film strip of the half size on the basis of the output of the signal from the second sensor.

Accordingly, the tape member can be reliably stuck to the full size photographic film strip and the half size photographic film strip. Thus, it is possible to improve the quality.

According to still another aspect of the present invention, there is provided a method for producing photographic roll films by winding a photographic film strip fed from a film supply section and a shield paper strip fed from a shield paper supply section around a spool while superimposing the photographic film strip and the shield paper strip to produce the photographic roll film; the method comprising a cutting process for cutting a lengthy photographic film fed from a film roll into those having a length suitable for a film size included in film information; a transport operation-changing process for changing transport operation for the photographic film strip after the cutting depending on the film size; and a transport timing-changing process for changing transport timing for the photographic film strip and transport timing for the shield paper strip depending on the film size.

The cutting process may include cutting the lengthy photographic film on the basis of a start signal corresponding to the film size to obtain the photographic film strip having a length suitable for a current film size.

In this process, the start signal may be based on an origin signal corresponding to the current film size, of a plurality of origin signals corresponding to the film sizes.

For example, the method may be carried out such that driving force of a driving motor for a suction drum, which is used to transport the lengthy photographic film fed from the film roll while making tight contact by the aid of suction of air, is transmitted to circular plates of a number corresponding to types of the film sizes included in the film information, each of the corresponding circular plates is rotated to make one turn when the lengthy photographic film is transported in a length of each of the corresponding film sizes, and the start signal is outputted when each of the circular plate is rotated to make one turn.

The transport operation for the photographic film strip may be changed in the transport operation-changing process so that low speed transport is performed for the photographic film strip only when the photographic film strip is cut, irrelevant to the film size.

The transport timing-changing process may include a photographic film strip transport stop process for detecting a forward end of the photographic film strip to facilitate once-stop irrelevant to the film size and detecting a forward end of the shortest photographic film strip to facilitate once-stop; and a shield paper stop process for once-stopping the shield paper strip to cut it into those having a prescribed length, and detecting a forward end inclined section of the shield paper strip corresponding to the shortest photographic film strip to facilitate once-stop.

It is preferable that appearance of the spool is inspected before performing a process for winding the photographic film strip and the shield paper strip around the spool.

It is also preferable that a heater block for thermal adhesion, which is exchangeable depending on the film size, is used for a seal-winding process for winding an opening seal around outer circumference of the shield paper strip wound around the spool.

According to still another aspect of the present invention, there is provided a method for producing photographic roll films by winding a photographic film strip fed from a film supply section and a shield paper strip fed from a shield paper supply section around a spool while superimposing the photographic film strip and the shield paper strip to produce the photographic roll film; the method comprising feeding the photographic film strip from the film supply section; wherein a winding diameter of a film roll is calculated on the basis of a number of revolution of a driving motor when a lengthy photographic film is fed in a predetermined length corresponding to a preset film size from the film roll wound with the lengthy photographic film as an original sheet of the photographic film strip; a number of revolution is calculated on the basis of the winding diameter to obtain a corrected number of revolution with which the lengthy photographic film is to be fed in the predetermined length within a predetermined period of time; and feedback control is made so that the number of revolution of the driving motor becomes the corrected number of revolution within a predetermined period of time while comparing the corrected number of revolution with a current number of revolution of the driving motor.

Accordingly, the lengthy photographic film can be continuously fed by rotating the film roll at the number of revolution corresponding to the winding diameter of the film roll. Thus, it is possible to efficiently feed the lengthy photographic film to the transport system disposed at the downstream stage.

In the process for determining the corrected number of revolution, the winding diameter of the film roll is calculated on the basis of the predetermined length corresponding to the film size to determine the corrected number of revolution corresponding to the winding diameter. Therefore, the lengthy photographic film can be fed from the film roll at the optimum number of revolution corresponding to the type of the photographic film strip to be manufactured.

Therefore, according to the method for producing photographic roll films concerning the present invention, the photographic roll films concerning two or more sizes can be easily produced in a switching manner. Thus, it is possible to realize a small scale of the production equipment, reduce the installation space, and reduce the production cost.

The process for obtaining the corrected number of revolution may include a process for calculating the winding diameter of the film roll on the basis of the number of revolution of the driving motor when the lengthy photographic film is fed in the predetermined length from the film roll; and a process for calculating the number of revolution for the lengthy photographic film to be fed in the predetermined length within the predetermined period of time on the basis of the winding diameter to give the corrected number of revolution.

In this method, the process for obtaining the winding diameter may include a process for detecting the number of revolution of the driving motor for driving and rotating the film roll; a process for detecting a feed amount of the lengthy photographic film from the film roll effected by the rotary driving of the driving motor; a process for comparing the feed amount with the predetermined length to measure a period of time during which the lengthy photographic film is fed in the predetermined length; a process for counting the number of revolution of the motor over the period of time of the measurement; and a process for calculating a current winding diameter of the film roll on the basis of an obtained counted value and a value corresponding to the predetermined length.

In the process for detecting the number of revolution of the driving motor, it is possible to use an encoder for making conversion and output of an electric signal having a number of pulses corresponding to the number of revolution of the driving motor, and a sensor for outputting a detection signal when a circular plate attached to a driving shaft is rotated to make one turn.

In the process for detecting the feed amount of the lengthy photographic film from the film roll, it is possible to use a roller for guiding the lengthy photographic film fed from the film roll to a transport line disposed at a downstream stage; and an encoder for making conversion and output of an electric signal having a number of pulses corresponding to the number of revolution of the roller.

Alternatively, it is possible to use a dancer roller for absorbing feed of the lengthy photographic film caused by transport stop of the lengthy photographic film as a result of cutting of the lengthy photographic film; and an electronic component for making conversion and output of an electric signal having a level corresponding to a movement distance of the dancer roller.

According to still another aspect of the present invention, there is provided a method for producing photographic roll films by winding a photographic film strip fed from a film supply section and a shield paper strip fed from a shield paper supply section around a spool while superimposing the photographic film strip and the shield paper strip to produce the photographic roll film; the method comprising a photographic film printing process for printing various information on the photographic film strip; wherein the photographic film printing process is executed such that printing is started on the basis of input of a start signal corresponding to a film size, and printing is performed on the photographic film strip in accordance with inputted printing data.

It is also preferable that the start signal is generated by selecting an origin signal corresponding to a current film size, of a plurality of origin signals generated in conformity with the film size.

In this method, it is also preferable that the origin signal is generated such that a driving motor for a suction drum, which is used to transport the lengthy photographic film fed from the film roll while allowing the lengthy photographic film to make tight contact by the aid of suction of air, is used as a driving source; driving force of the driving motor is transmitted to each of circular plates of a number corresponding to types of the film size to be included in the film information; each of the corresponding circular plates is rotated to make one turn when the lengthy photographic film is transported in an amount of a length corresponding to each the film sizes; and detection is made for the fact that each of the corresponding circular plates is rotated to make one turn.

According to still another aspect of the present invention, there is provided a method for producing photographic roll films by winding a photographic film strip fed from a film supply section and a shield paper strip fed from a shield paper supply section around a spool while superimposing the photographic film strip and the shield paper strip to produce the photographic roll film; wherein the method comprises a tape-sticking transport process for sticking a tape member such as an adhesive tape to the photographic film strip; the tape-sticking transport process includes using a plurality of transport roller pairs corresponding to types of film sizes, installed at a transport passage disposed at a downstream stage of a tape-sticking section for sticking the tape; and control is made to successively select a plurality of preset transport 10 roller pairs of the plurality of transport roller pairs corresponding to the film size so that any one of the transport roller pair of the plurality of successively selected transport roller pairs is used to transport the photographic film strip.

Accordingly, the photographic roll films concerning two or more sizes can be easily produced in a switching manner. Thus, it is possible to realize a small scale of the production equipment, reduce the installation space, and reduce the production cost.

In the method described above, it is also preferable that first to third transport roller pairs installed corresponding to a full size and a half size of the photographic film strip are used; when the photographic film strip to be stuck with the tape is of the full size, the first transport roller pair disposed nearest to the tape-sticking section and the third transport roller pair disposed furthest from the tape-sticking section are successively selected depending on a transport state of the photographic film strip to make control such that the photographic film strip is transported by any one of the transport roller pair of the first to third transport roller pairs; and when the photographic film strip to be stuck with the tape is of the half size, the first to third transport roller pairs are successively selected depending on a transport state of the photographic film strip to make control such that the photographic film strip is transported by any one of the transport roller pair of the first to third transport roller pairs.

It is also preferable that the method may further comprise using a first sensor installed in the vicinity of the third transport roller pair, for detecting a forward end of the photographic film strip irrelevant to the film size to output a signal to facilitate once-transport stop; and a second sensor installed in the vicinity of the second transport roller pair, for detecting a forward end of the photographic film strip of the half size to output a signal to facilitate once-transport stop; wherein the tape member is stuck to the photographic film strip, i.e., to the photographic film strip of the full size on the basis of the output of the signal from the first sensor, or to the photographic film strip of the half size on the basis of the output of the signal from the second sensor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Illustrative embodiments of the apparatus and the method for producing photographic roll films according to the present invention (hereinafter simply referred to as "production apparatus according to the embodiment") will be explained below with reference to FIGS. 1 to 16.

Figure 1:
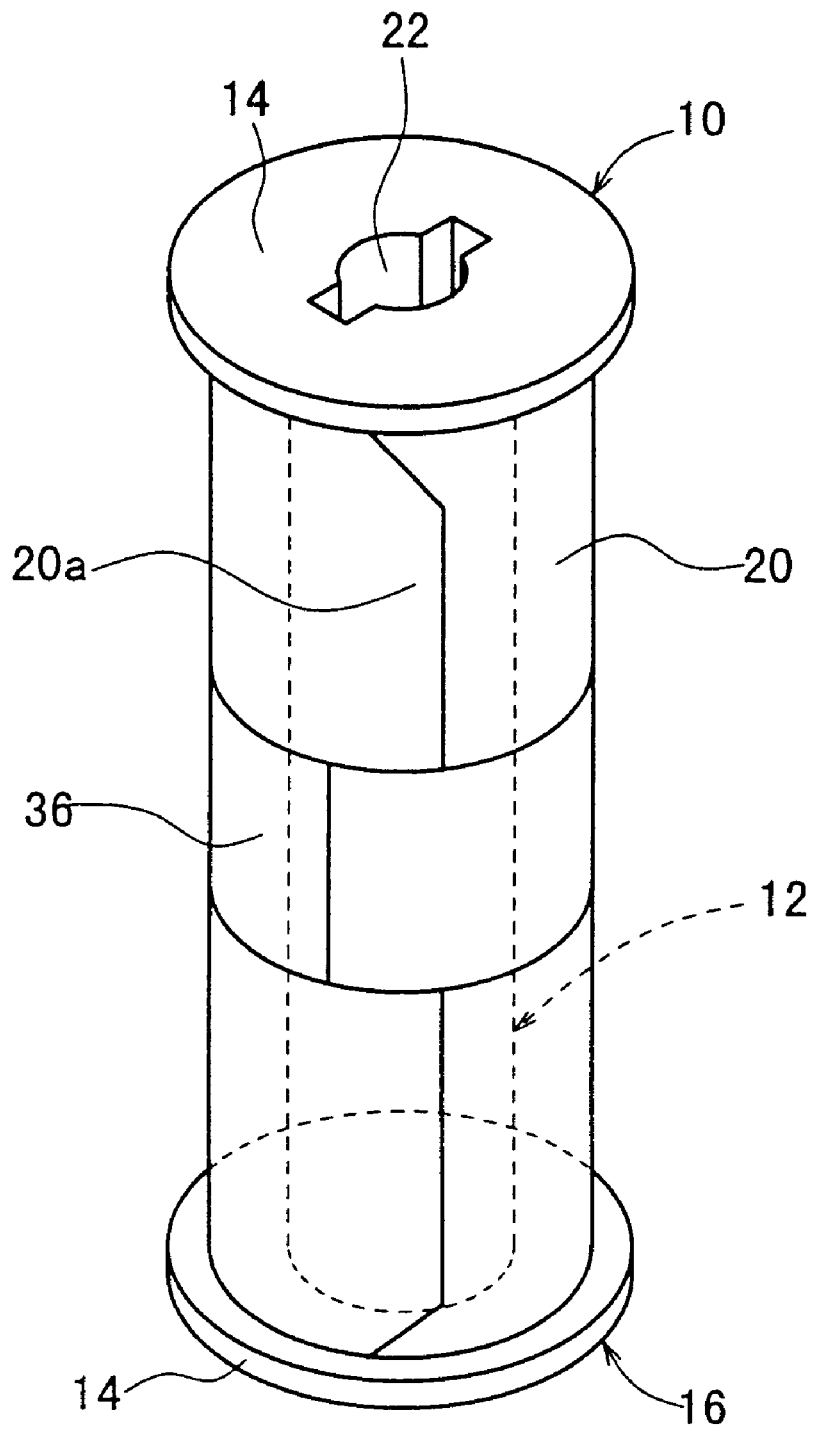
FIG. 1 shows a perspective view illustrating a photographic roll film produced by a production apparatus according to an embodiment of the present invention.
Figure 2:
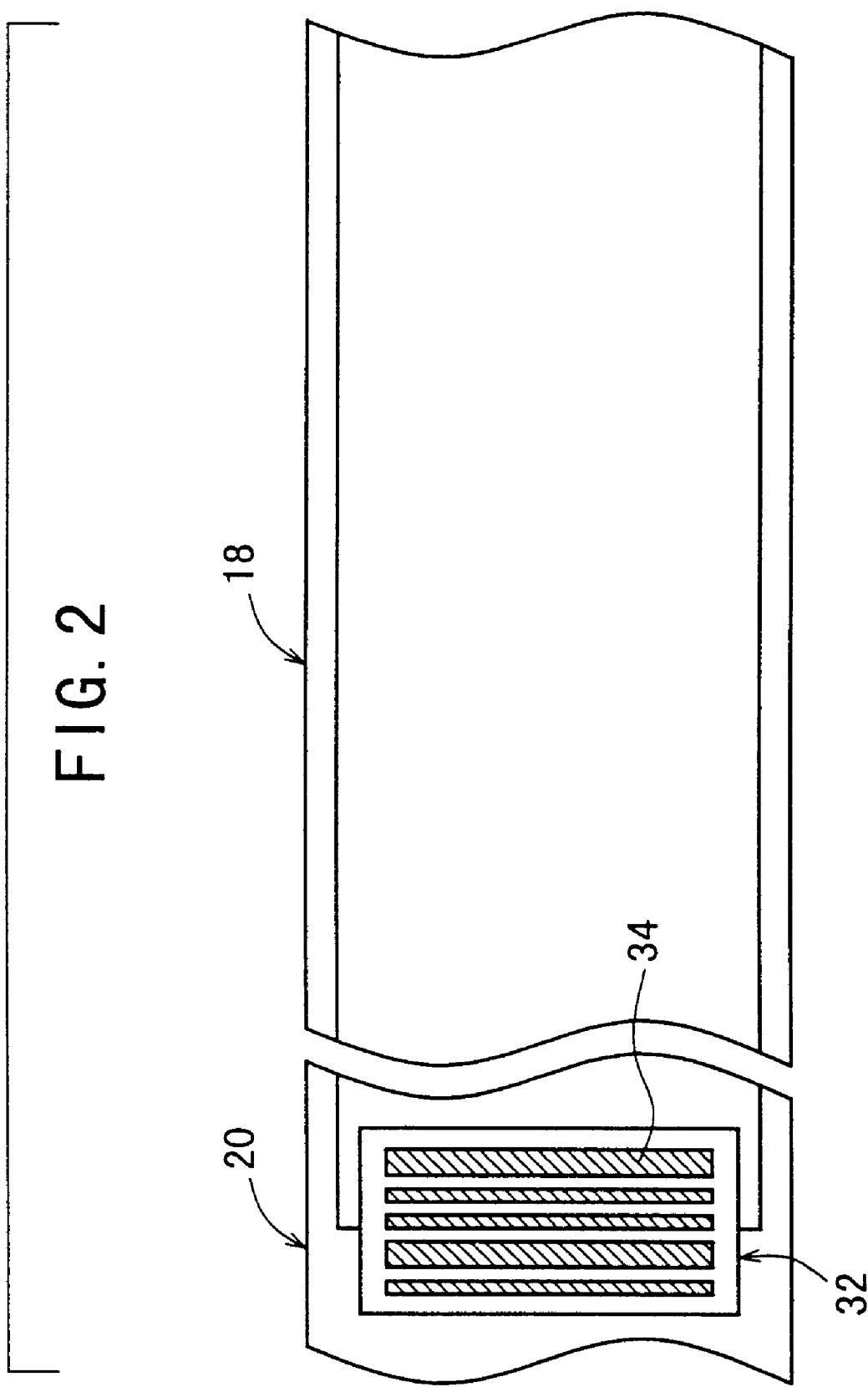
FIG. 2 illustrates an adhesive tape and a photographic film strip.

The production apparatus according to the embodiment is constructed to correspond to the case in which, for example, those of the full size and the half size are produced for the 120 type photographic roll film 10 (see FIG. 1).

As shown in FIG. 1, the 120 type photographic roll film 10 comprises, in the case of both of the full size and the half size, a spool 16 which is provided with circular plate-shaped flanges 14 disposed at both ends of a columnar shaft section 12, a photographic film strip 18 (see FIG. 2) which is a band-shaped photographic film to be wound around the shaft section 12 of the spool 16, and a shield paper strip which is arranged as back side paper over the entire back surface of the photographic film strip 18.

Figure 3:
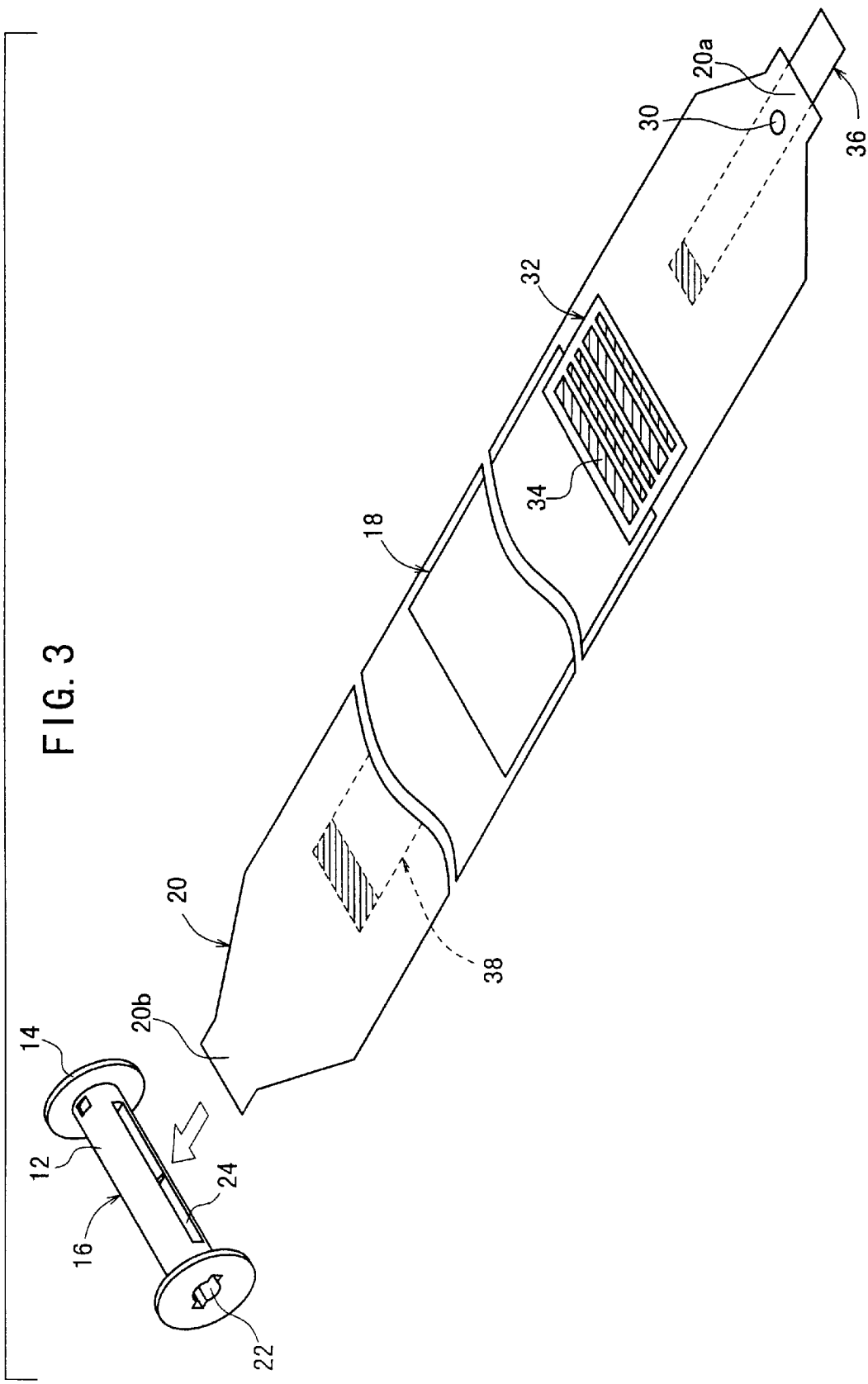
FIG. 3 shows an exploded perspective view illustrating a structure of the photographic roll film.

The spool 16 has a chucking groove 22 to be engaged with a key shaft of a camera, the chucking groove 22 being formed at the end surface of each of the flanges 14. As shown in FIG. 3, a slender slit 24 is formed in the shaft section 12 in the axial direction. A substantially T-shaped engaging pawl 26 is integrally formed on one inner wall surface 24a of the slit 24. A pair of pressing ribs 28 are integrally formed on the other inner wall surface 24b about the center of the fastening pawl 26.

As shown in FIG. 3, the shield paper strip 20 has a band-shaped configuration, and it is formed at both ends with a rearward end 20b which is fastened to the spool 16 during the production, and a forward end 20a which is fastened to the spool 16 of the cameral upon charging to the camera.

The rearward end 20b and the forward end 20a are cut obliquely to have a narrow width so that they may be easily inserted into the slit 24 of the spool 16. A circular fastening hole 30 is formed at the forward end 20a.

Figure 4:
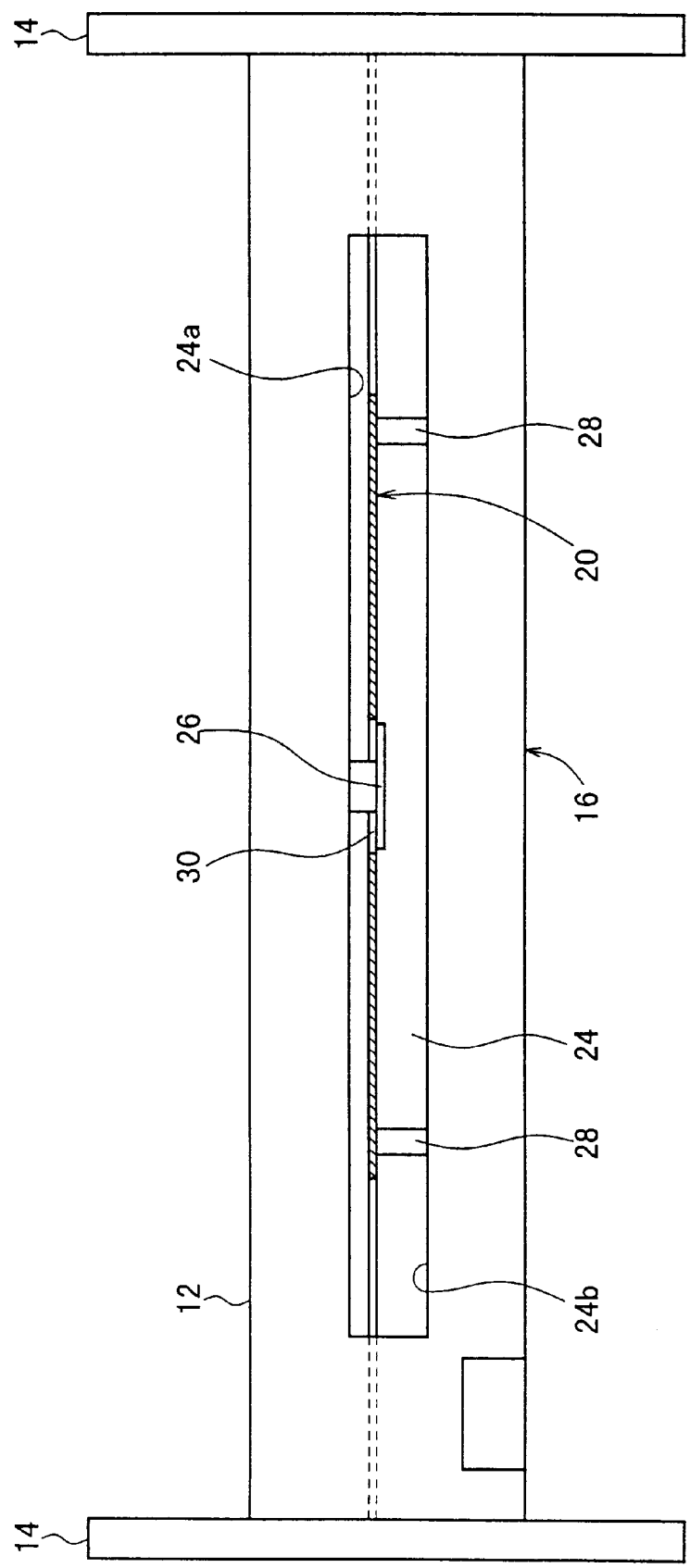
FIG. 4 shows a front view illustrating the inside of a slit of a spool.

As shown in FIG. 4, when the forward end 20a of the shield paper strip 20 is inserted into the slit 24 of the spool 16, the fastening pawl 26 is engaged with the fastening hole 30. The pressing ribs 28 press the shield paper strip 20 so that the shield paper strip 20 is not moved in a direction to make disengagement of the fastening hole 30 and the fastening pawl 26.

The photographic film strip 18 is fixed only at its forward end to the back surface side of the shield paper strip 20 by the aid of an adhesive tape 32, while giving a prescribed distance from the forward end of the shield paper strip 20. A bar code 34, which indicates the size, the sensitivity, and the film type of the photographic film strip 18, is printed on the adhesive tape 32. The bar code is read, for example, by a bar code reader incorporated into the camera or the like to be used for switching and control of various settings of the camera.

An opening seal 36, which is wound around the outer circumference of the shield paper strip 20 when the film is not used to prevent the shield paper strip 20 from being wound, is stuck to the forward end side of the surface of the shield paper strip 20. An enclosing seal 38, which is wound around the outer circumference of the shield paper strip 20 after completion of the photographing operation to prevent the shield paper strip 20 from being wound, is stuck to the rearward end side of the shield paper strip 20. The opening seal 36 and the enclosing seal 38 are stuck to the shield paper strip 20 only at portions indicated by hatched lines in FIG. 3.

Figure 5:
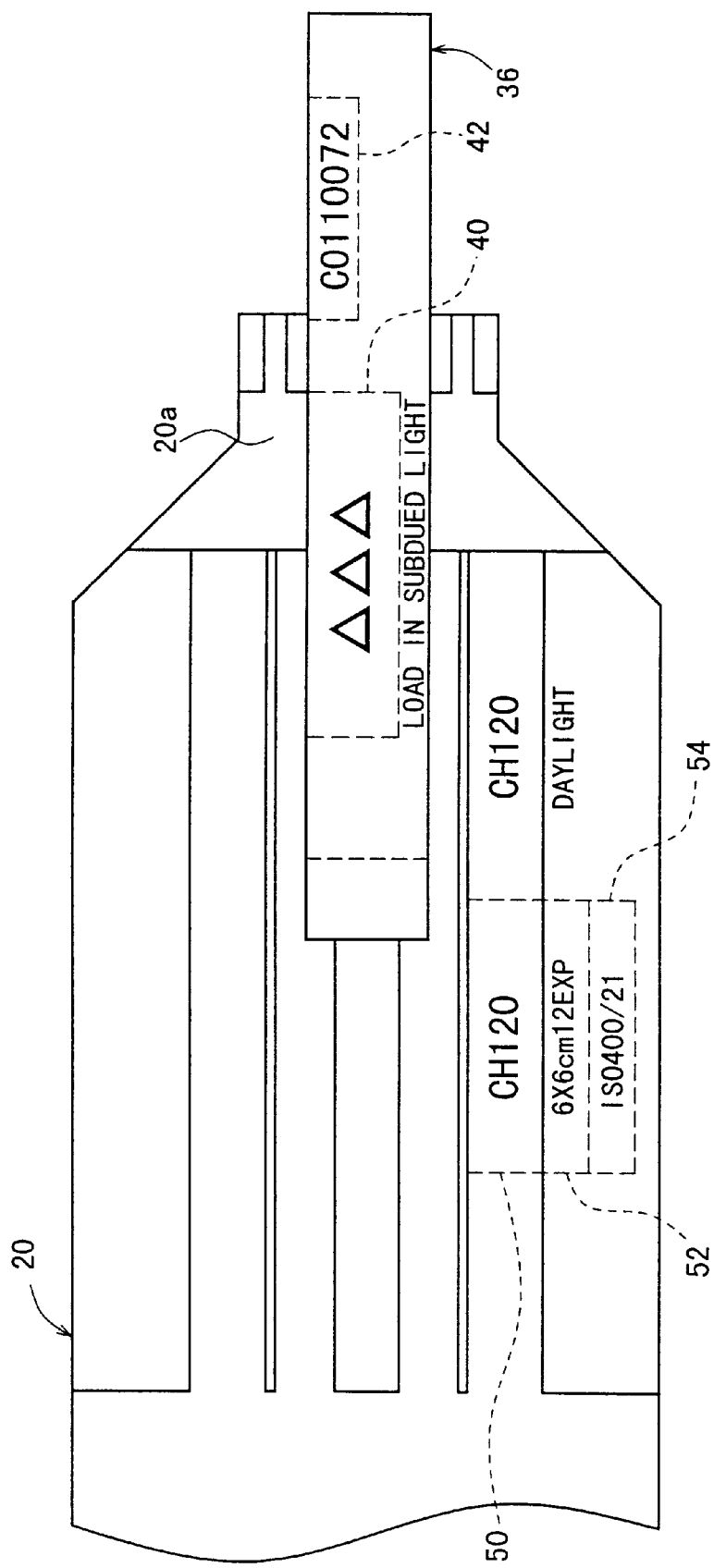
FIG. 5 illustrates forward ends of an opening seal and a shield paper strip.

The opening seal 36 is wound around the outer circumference of the shield paper strip 20 wound around the shaft section 12 of the spool 16 after the portion indicated by the hatched lines is stuck to the surface on the side of the forward end 20a of the shield paper strip 20. As shown in FIG. 5, a product name 40 for indicating film information is previously printed on the opening seal 36. The same serial number 42 as that side-printed on the photographic film strip 18 is printed in the vicinity of the product name 40.

Figure 6:
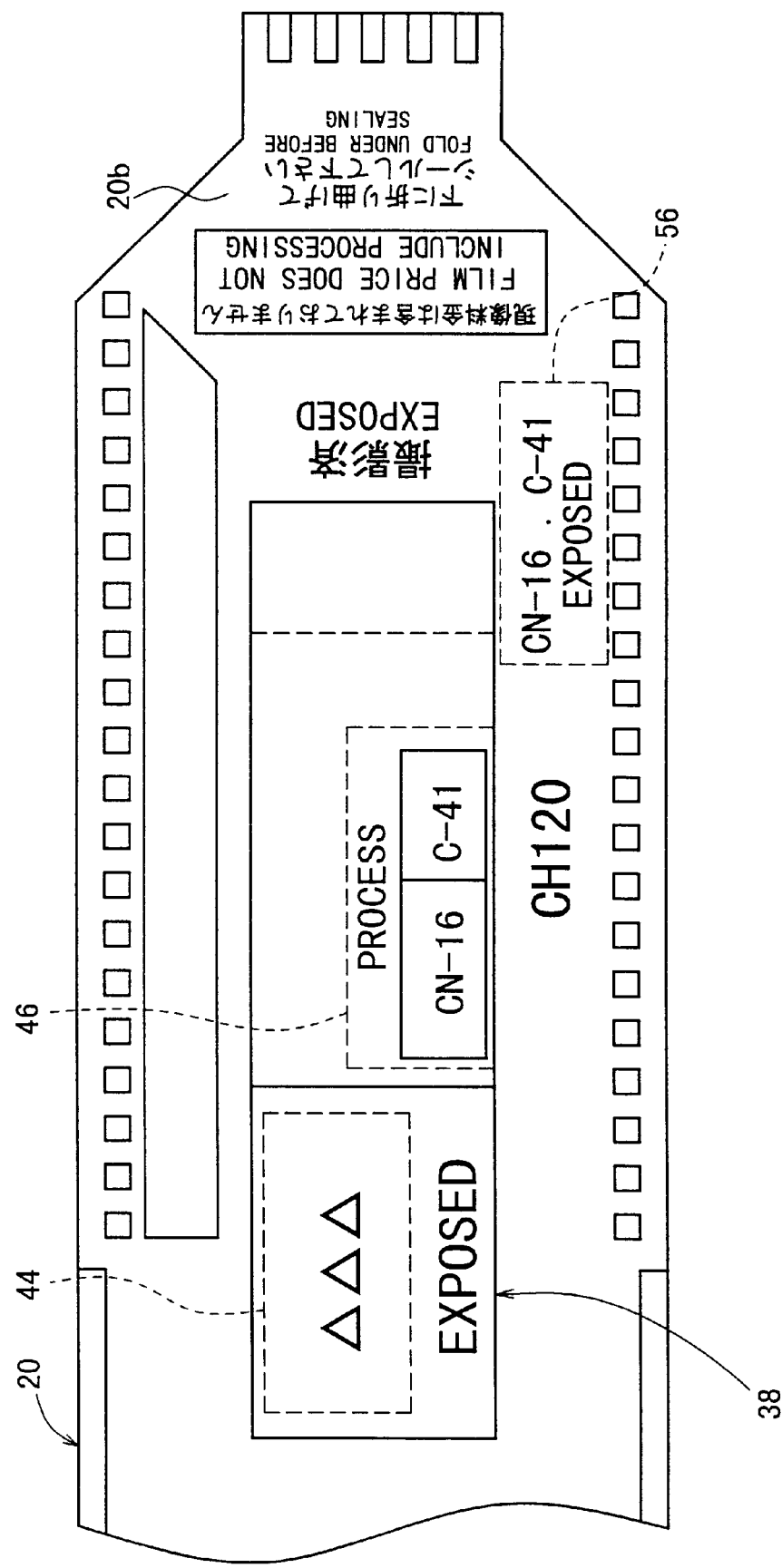
FIG. 6 illustrates rearward ends of an enclosing seal and the shield paper strip.

The enclosing seal 38 is stuck to the surface on the side of the rearward end 20b of the shield paper strip 20 only at its one end indicated by the hatched lines during the production. The enclosing seal 38 is wound around the spool 16 together with the shield paper strip 20. The enclosing seal 38 is exposed to the outside when the photographic film strip 18 and the shield paper strip 20 are wound around the spool 16 of the camera, and it is used to avoid any winding looseness of the photographic film strip 18 and the shield paper strip 20. As shown in FIG. 6, the product name 44 and the treatment number 46 indicating film information are previously printed on the enclosing seal 38.

As shown in FIGS. 5 and 6, pieces of information 50, 52, 54, 56, which indicate the specification of the photographic roll film 10, are previously printed on the forward end 20a and the rearward end 20b of the shield paper strip 20 respectively.

The film information 50 indicates the type of the photographic roll film 10 and the film type. For example, "CH120" indicates that the film is of the 120 type, and the photographic film strip 18 wound at the inside is a color negative film.

The film information 52 indicates the size of the photographic roll film 10. For example, "6×6 cm 12 EXP" indicates that the wound photographic film strip 18 can be used for the photographing operation of 6 cm×6 cm format in 12 frames, i.e., the photographic film strip 18 is of the full size.

The film information 54 indicates the sensitivity of the photographic film strip 18. For example, "ISO400/21°" indicates that the ISO sensitivity is 400. The film information 56 is the treatment number indicating the treatment method for the wound photographic film strip 18.

Figure 7:
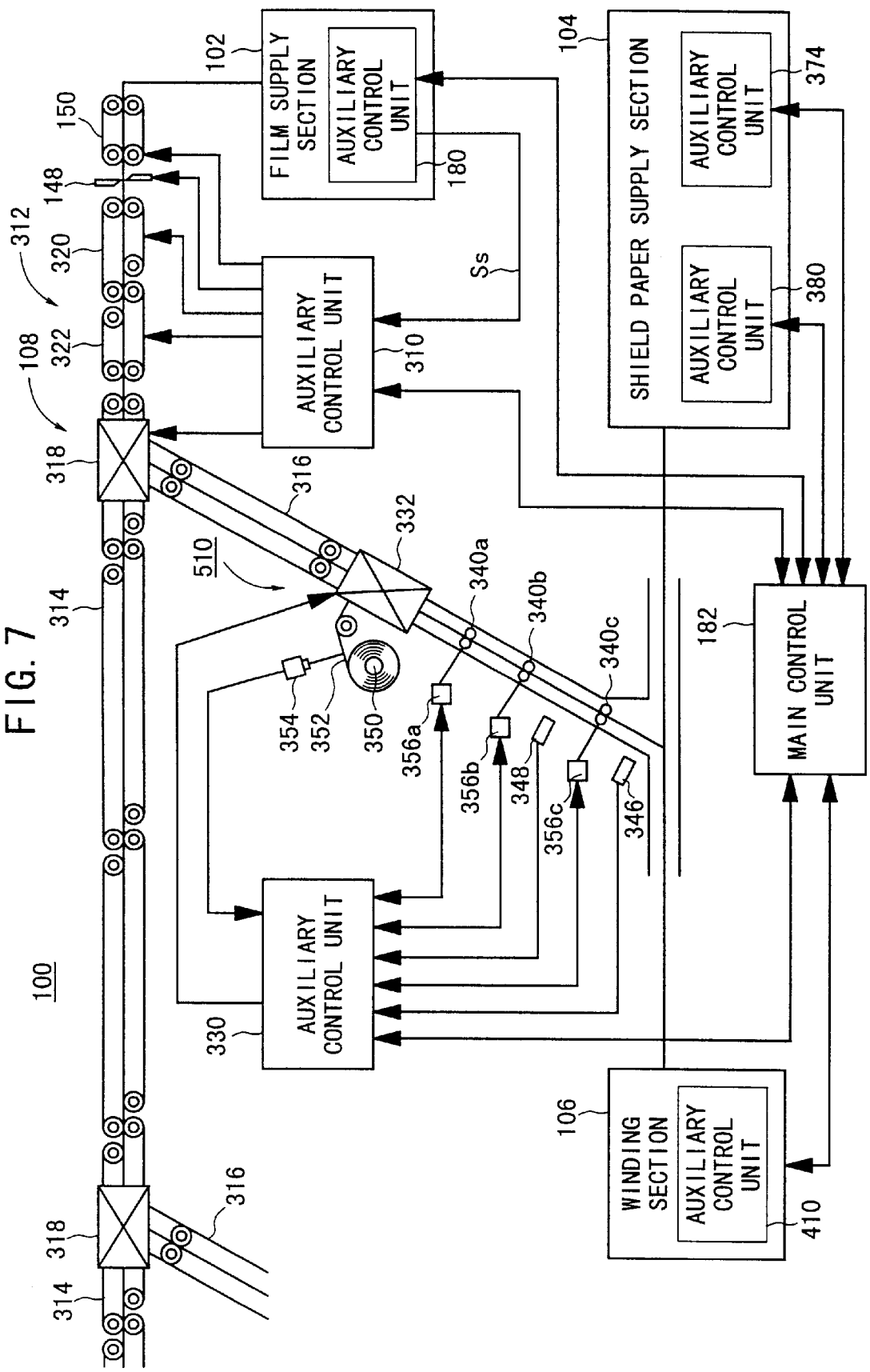
FIG. 7 shows an arrangement of the production apparatus according to the embodiment of the present invention.

As shown in FIG. 7, the production apparatus 100 according to the embodiment of the present invention comprises a film supply section 102 for supplying the photographic film strip 18, a shield paper supply section 104 for supplying the shield paper strip 20, a winding section 106 for winding the photographic film strip 18 and the shield paper strip 20 around the spool 16, and a transport line 108 for transporting the photographic film strip 18 to the winding section 106. Each of the supply sections 102, 104 and the winding section 106 include a variety of apparatuses which are arranged along the transport passage to apply processing and various operations to the photographic film strip 18, the shield paper strip 20, and the spool 16.

Figure 8:
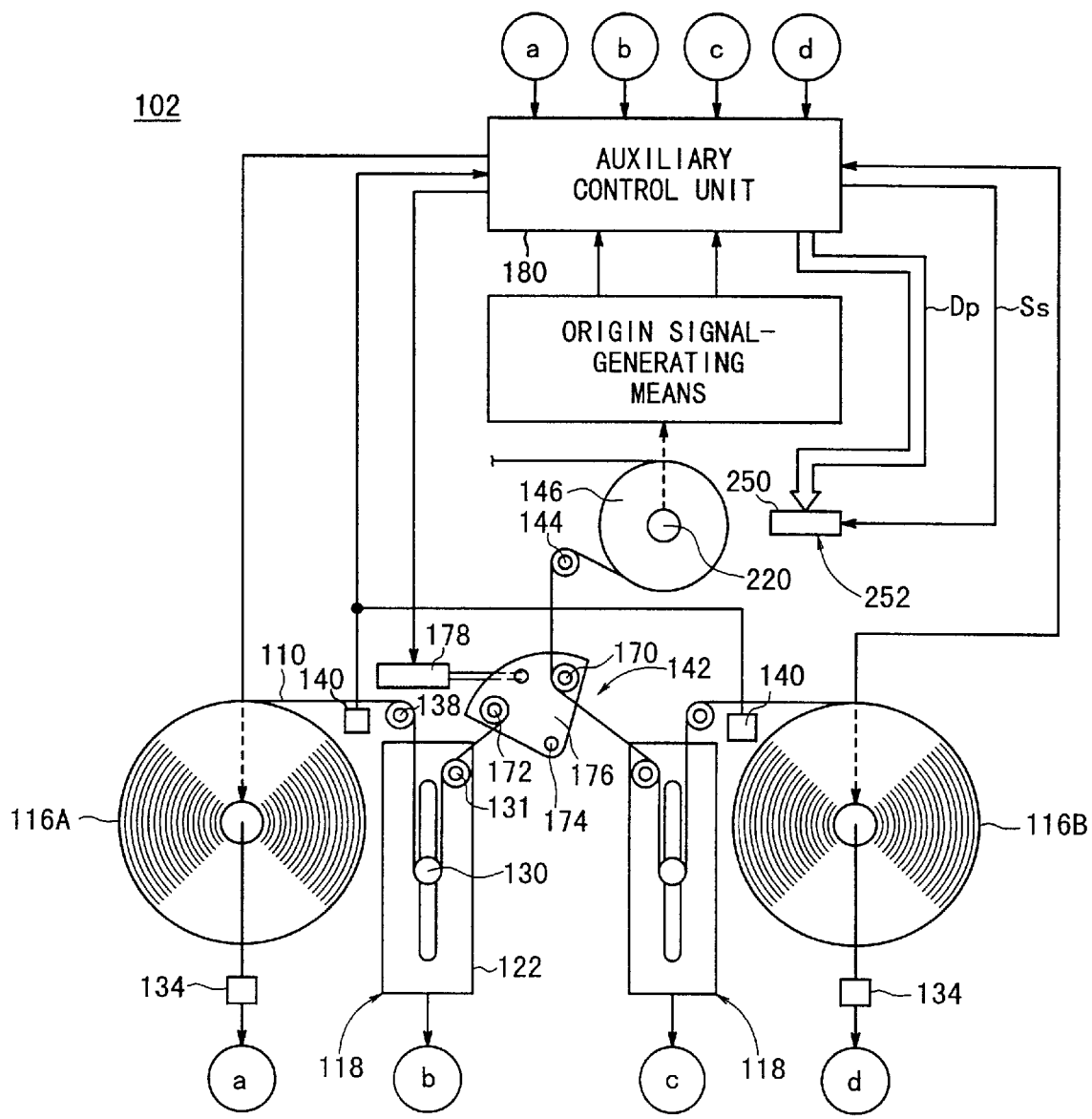
FIG. 8 shows an arrangement of a film supply section of the production apparatus according to the embodiment of the present invention.
Figure 9:
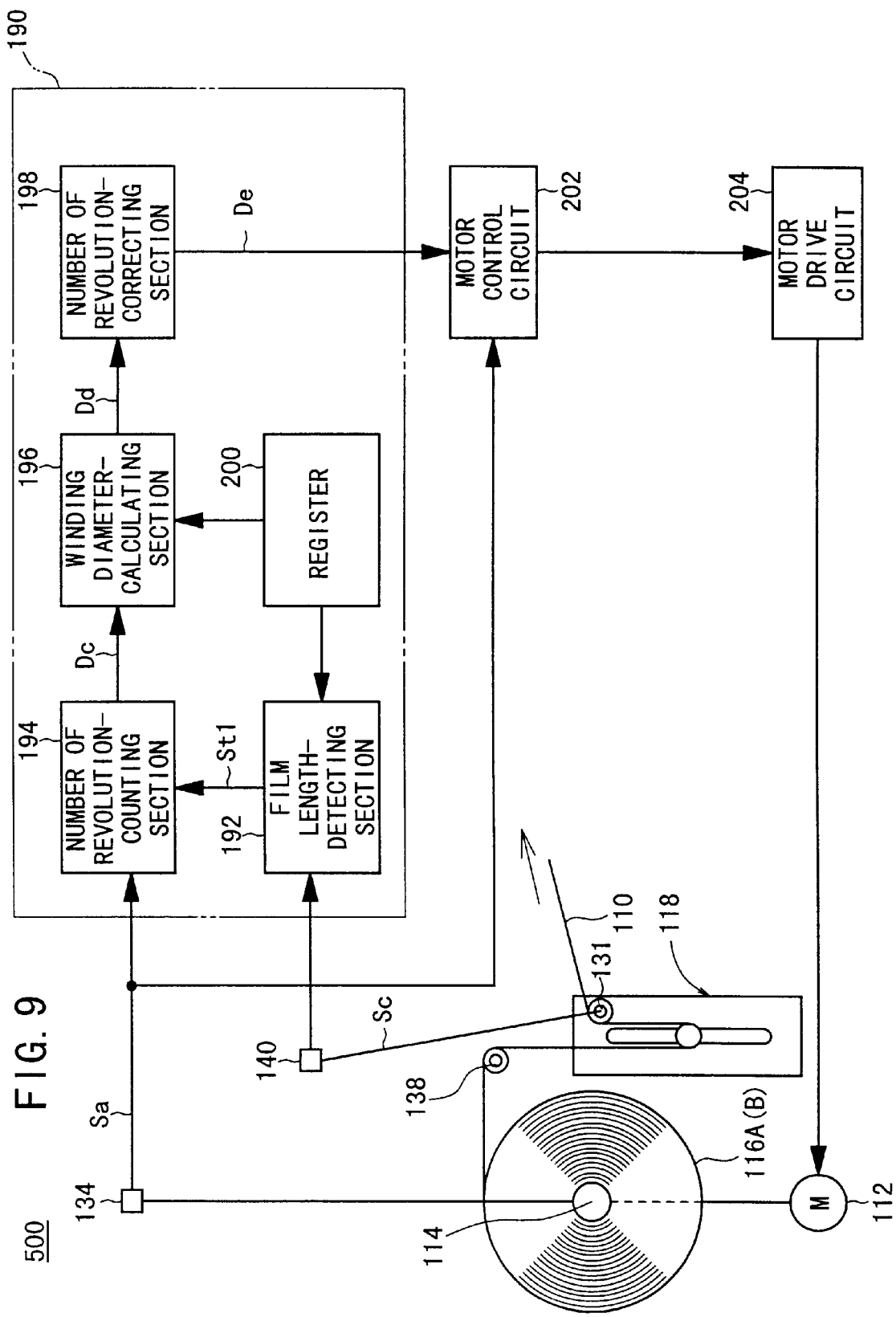
FIG. 9 shows an arrangement of an exemplary rotation control means.

As shown in FIG. 8, the film supply section 102 is arranged with two film rolls (first and second film rolls 116A, 116B) each of which comprises the lengthy photographic film 110 wound in a rolled configuration around a rotary shaft 114 of a driving motor 112 (see FIG. 9). Each of the first and second film rolls 116A, 116B is produced as follows. That is, a wide-width film base is allowed to have a rolled configuration to give an original sheet roll to which a predetermined emulsion is applied to produce a master roll. The master roll is cut into those having a width of the photographic film strip 18, followed by being wound to give the rolled configuration.

A dancer roller section 118, which catches the lengthy photographic film 110 fed from each of the film rolls 116A, 116B, is arranged in the vicinity of each of the first and second film rolls 116A, 116B.

Figure 10:
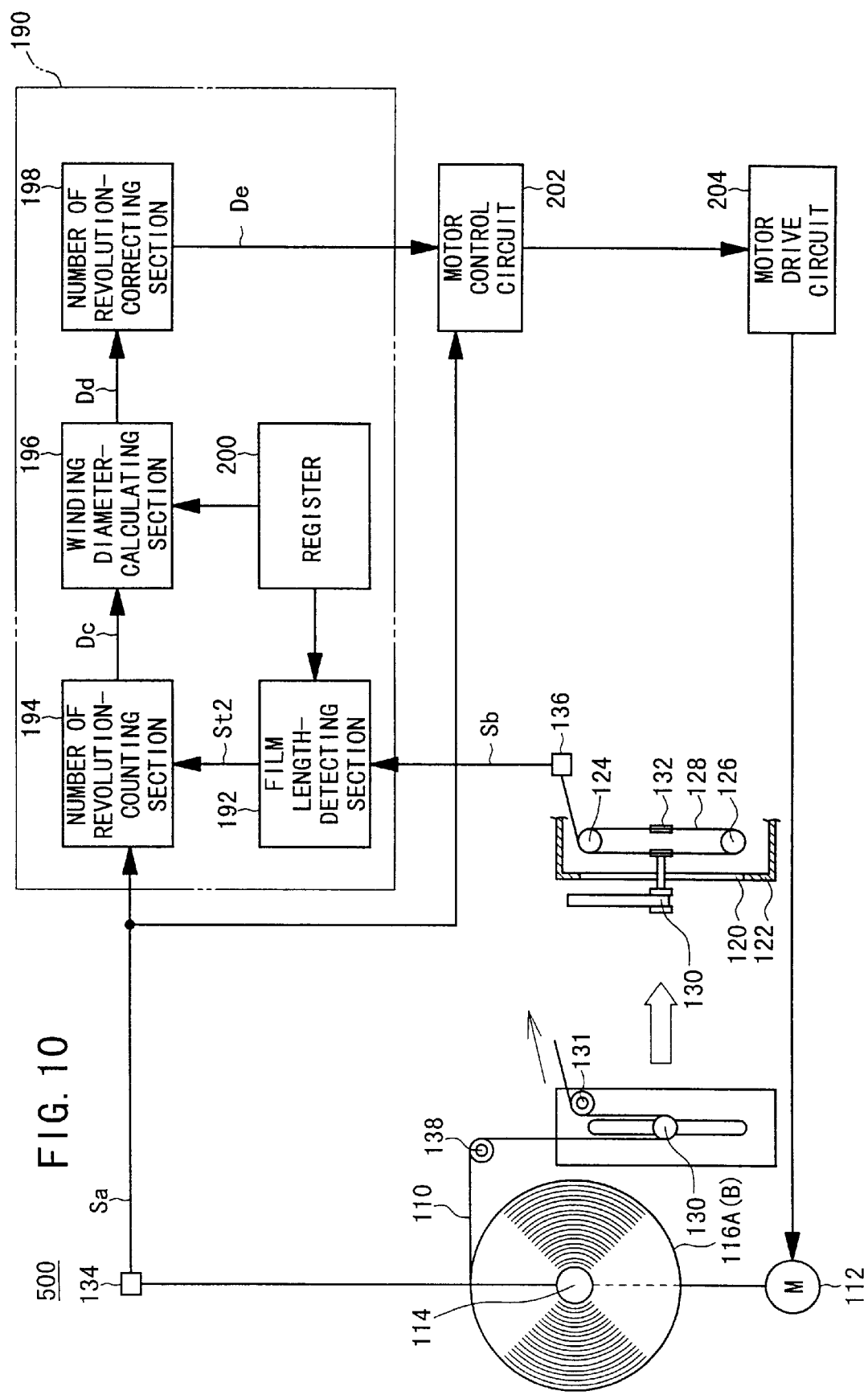
FIG. 10 shows an arrangement of another exemplary rotation control means.

The dancer roller section 118 is made of, for example, plastic or metal. As shown in FIG. 10, the dancer roller section 118 comprises a guide section 122 which is formed with a slit 120 in the vertical direction, rollers 124, 126 which are provided at upper and lower positions at the inside of the guide section 122, a belt 128 which is stretched between the rollers 124, 126, a dancer roller 130 which is provided at a portion of the belt 128 in the vicinity of the slit 120 and which is movable in the upward and downward directions along the slit 120 at the outside of the guide section 122, a roller 131 for guiding the photographic film strip 18 transported by the dancer roller 130 to a switching apparatus 142 as described later on at the outside of the guide section 122, and a weight 132 which is provided at a portion of the belt 128 on the side opposite to the portion at which the dancer roller 130 is provided. The weight 132 is provided to avoid sudden downward movement which would be otherwise caused by the self-weight of the dancer roller 130, and sudden upward movement which would be otherwise caused by the transport of the lengthy photographic film 110.

The roller 131 is connected with a rotary encoder 140 for making conversion into an electric signal Sc having pulses corresponding to the number of revolution of the roller 131.

As shown in FIG. 9, a rotary encoder 134, which makes conversion and output of an electric signal Sa having a number of pulses corresponding to the number of revolution of the rotary shaft 114, is provided for the rotary shaft 114 around which the film roll 116A, 116B is wound. As shown in FIG. 10, a potentiometer 136, which makes conversion and output of an electric signal Sb having a voltage level changing in response to the number of revolution, is provided for an upper roller 124 which is installed in the guide section 122 of the dancer roller section 118.

As shown in FIG. 9, a roller 138, which is used to catch the lengthy photographic film 110 fed from each of the film rolls 116A, 116B with the dancer roller 130, is installed between each of the dancer roller sections 118 and each of the film rolls 116A, 116B.

As shown in FIG. 8, a switching apparatus 142 is installed over the respective dancer roller sections 118, for selectively switching the film rolls 116A, 116B of the first and second film rolls 116A, 116B. Those installed over the switching apparatus 142 are a pass roller 144, a suction drum 146 for transporting the lengthy photographic film 110 transported via the pass roller 144 while making tight contact by the aid of suction of air, and a transport belt 150 for transporting the lengthy photographic film 110 transported from the suction drum 146 to a film cutter 148 which is arranged on the downstream side.

Figure 11:
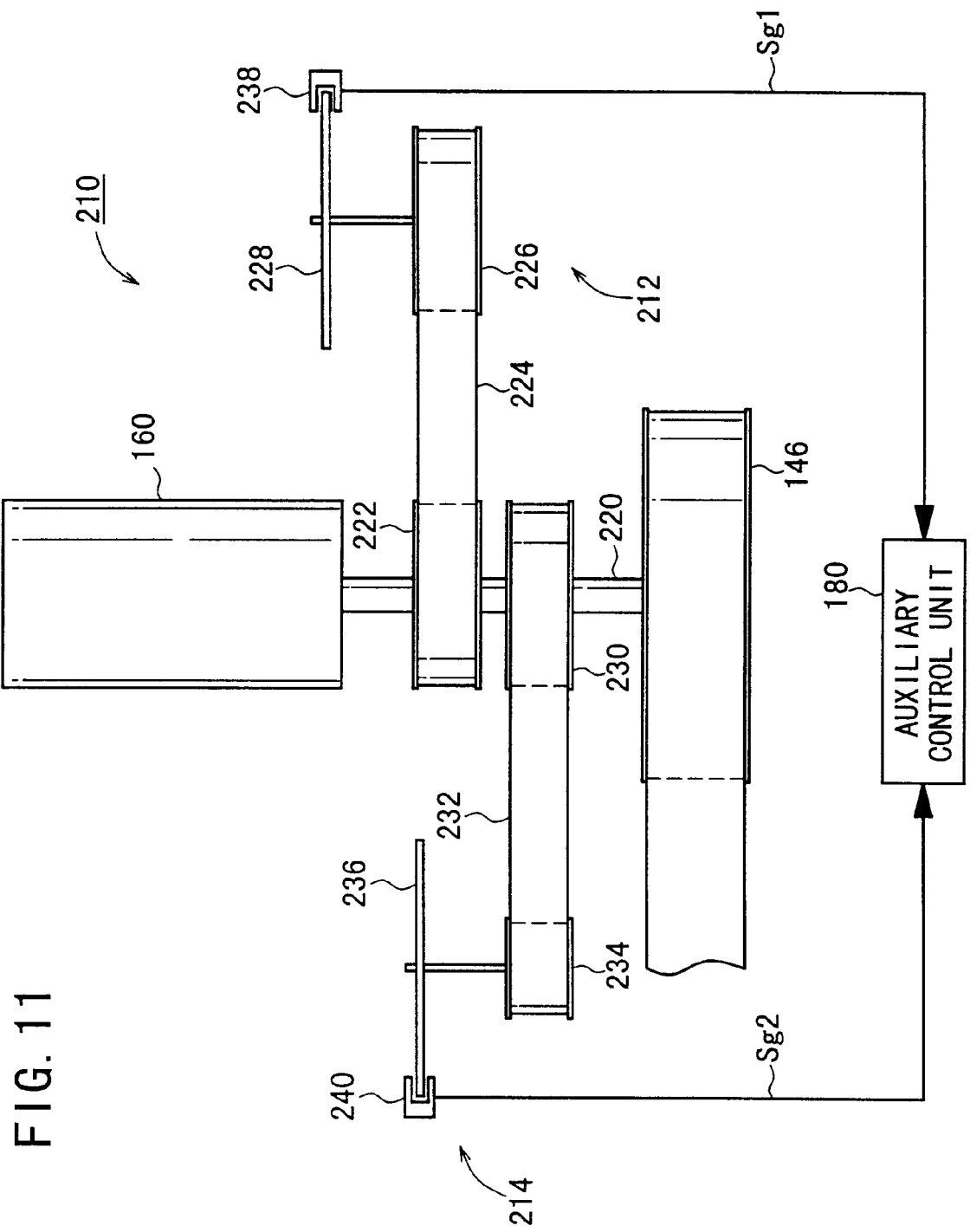
FIG. 11 shows an arrangement of an exemplary origin signal-generating means.

The suction drum 146 is driven by a driving motor (see FIG. 11). The suction drum 146 is provided with a large number of air suction holes disposed on the circumferential surface. The lengthy photographic film 110 is transported not to cause any slip while making tight contact by the aid of the suction of air.

The dancer roller 130 of the dancer roller section 118 is always located at a lower portion of the slit 120 due to the self-weight in the natural state. However, the dancer roller 130 is moved to an upper portion of the slit 120 by being urged upwardly in accordance with the transport operation for the lengthy photographic film 110 when the lengthy photographic film 110 is caught thereby.

When the transport of the lengthy photographic film 110 is once stopped as a result of the cutting of the lengthy photographic film 110, the urging force caused by the transport disappears. Therefore, the dancer roller 130 is slowly moved downwardly by the aid of the self-weight and the weight 132 in conformity with the feed speed of the lengthy photographic film 110 from the film roll 116A or 116B. In this arrangement, it is more preferable that the tension is applied to the dancer roller 130, for example, with a powder brake or a hysteresis clutch. The tension may be always applied, or it may be applied for an arbitrary period of time.

Therefore, the stroke length of the dancer roller 130 has, at the minimum, a length of such an extent that the length of the lengthy photographic film 110 fed from the film roll 116A or 116B during the transport stop period for the lengthy photographic film 110 may be absorbed.

The switching apparatus 142 has two rollers 170, 172 which are rotatably attached to allow the lengthy photographic film 110 fed from the dancer roller section 118 to travel along the upward transport passage. The switching apparatus 142 includes a switching plate 176 which is rotatable about the center of a support shaft 174, and a reciprocating mechanism 178 (air cylinder) for rotating the switching plate 176 by a predetermined angle in both directions respectively about the center of the support shaft 174.

The exemplary arrangement shown in FIG. 8 is illustrative of a case in which the switching plate 176 is rotated in the leftward direction by a predetermined angle, and the lengthy photographic film 110 fed from the right film roll 116B is transported upwardly by the aid of the right roller 170 provided on the switching plate 142. When the lengthy photographic film 110 fed from the left film roll 116A is transported, the switching plate 142 is rotated by a predetermined angle in the rightward direction to perform the transport.

The driving motor 112 (see FIG. 9), the dancer roller section 118, the switching apparatus 142, the suction drum 146, the transport belt 150, and the film cutter 148 are controlled by a first auxiliary control unit 180 composed of a microcomputer and various control circuits. The first auxiliary control unit 180 is controlled by a main control unit 182 which controls the entire production apparatus 100. The first auxiliary control unit 180 appropriately inputs obtained data into the main control unit 182. The main control unit 182 also serves as the collating means for collating the production information and the film information concerning the respective components for constructing the photographic roll film 10.

Explanation will now be made for the rotation control of the film rolls 116A, 116B of the feed control apparatus 500, which is one of the features of the production apparatus 100 according to the embodiment of the present invention.

As shown in FIGS. 9 and 10, the rotation control is performed by a rotation control means 190 which is incorporated as a hardware or a software into the first auxiliary control unit 180.

As shown in FIG. 9, the rotation control means 190 comprises a film length-detecting section 192, a number of revolution-counting section 194, a winding diameter-calculating section 196, and a number of revolution-correcting section 198.

The film length-detecting section 192 calculates the length of the lengthy photographic film 110 on the basis of the number of pulses of an electric signal Sc supplied from the rotary encoder 140 for detecting the number of revolution of the roller 131, and it outputs a first timing signal St1 at a point of time at which a predetermined film length stored in a register 200 is obtained. The register 200 stores the film length (full size or half size) fed from the main control unit 182.

The number of revolution-counting section 194 starts the counting operation for the number of pulses of the electric signal Sa supplied from the rotary encoder 134 attached to the rotary shaft 114 of the driving motor 112, on the basis of the input of the first timing signal St1 from the film length-detecting section 192. The number of revolution-counting section 194 outputs the counted value up to now (counted value D) to the winding diameter-calculating section 196 disposed at the downstream stage, on the basis of the input of the next first timing signal St1, and it simultaneously resets the counted value Dc to be zero. That is, for example, the counting of the pulses is started on the basis of the input of the first timing signal St1 of the odd number. The counted value Dc is outputted and it is simultaneously reset to be zero on the basis of the input of the first timing signal St1 of the even number.

The rotary encoder 134 may be constructed with a code plate for generating a pulse array in response to the number of revolution. Alternatively, the rotary encoder 134 may be constructed such that one pulse is outputted every time when the rotary shaft 114 of the driving motor 112 is rotated to make one turn.

The winding diameter-calculating section 196 calculates the current winding diameter of the film roll 116A or 116B on the basis of the counted value Dc supplied from the number of revolution-counting section 194 and the film length stored in the register 200, and it outputs an obtained calculated value Dd to the number of revolution-correcting section 198 disposed at the downstream stage.

The number of revolution-correcting section 198 calculates the number of revolution suitable for the winding diameter obtained by the winding diameter-calculating section 196, i.e., the number of revolution with which the photographic film having the prescribed film length is to be fed within the predetermined period of time, and it outputs an obtained result as a corrected number of revolution De.

The corrected number of revolution De, which is outputted from the number of revolution-correcting section 198, is supplied to a motor control circuit 202 for making feedback control for the driving motor 112. The motor control circuit 202 supplies a necessary driving current to a motor drive circuit 204 so that the number of revolution of the driving motor 112 becomes the concerning corrected number of revolution De within a predetermined period of time, while comparing the supplied corrected number of revolution De with the current number of revolution of the driving motor 112.

As described above, by using the rotation control means 190 as described above, the lengthy photographic film 110 can be continuously fed by rotating the film roll 116A or 116B at the number of revolution in conformity with the winding diameter of the film roll 116A or 116B. Thus, it is possible to efficiently feed to the lengthy photographic film 110 to the transport system disposed at the downstream stage.

In the rotation control means 190, the film length corresponding to the type of the current film is stored in the register 200. The winding diameter is calculated on the basis of the film length to determine the corrected number of revolution De in conformity with the winding diameter. Therefore, the lengthy photographic film 110 can be fed from the film roll 116A or 116B at the optimum number of revolution in conformity with the type of the photographic film strip 18 to be manufactured.

Except for the above, it is possible to adopt an arrangement as shown in FIG. 10 for the rotation control means 190, especially for the film length-detecting section 192 and the number of revolution-counting section 194.

That is, when the lengthy photographic film 110 is cut by the film cutter 148 into those having the predetermined length, the transport is temporarily stopped. However, even in the stop period, the lengthy photographic film 110 is continuously fed from the film roll 116A or 116B. Therefore, the dancer roller 130 of the dancer roller section 118 is moved downwardly due to the self-weight. The feed length (film length) of the lengthy photographic film 110 can be detected by measuring the movement distance of the dancer roller 130 during the above process. As shown in FIG. 10, the movement distance can be detected, for example, with the voltage level of the electric signal Sb fed from the potentiometer 136 connected to the upper roller 124 of the dancer roller section 118.

Accordingly, the film length-detecting section 192 is constructed such that a second timing signal St2 is outputted when the voltage level of the electric signal Sb from the potentiometer 136 arrives at a voltage level corresponding to the predetermined length of the lengthy photographic film 110.

The number of revolution-counting section 194 starts the counting operation for the number of pulses of the electric signal Sa supplied from the rotary encoder 134, on the basis of the input of a signal to indicate the transport stop of the lengthy photographic film 110 (a start signal Ss described later on may be used). The number of revolution-counting section 194 outputs the counted value up to now (counted value Dc) to the winding diameter-calculating section 196 disposed at the downstream stage, on the basis of the input of the next second timing signal St2, and it simultaneously resets the counted value Dc to be zero.

Even when the arrangement shown in FIG. 10 is adopted, the film roll 116A or 116B can be continuously subjected to the feeding at the number of revolution in conformity with the winding diameter of the film roll 116A or 116B. Thus, it is possible to efficiently feed the lengthy photographic film 110 to the transport system disposed at the downstream stage.

Next, explanation will be made for the origin signal-generating process which is a feature of the production apparatus 100 according to the embodiment of the present invention.

The origin signal-generating process is performed by an origin signal-generating means 210 (see FIG. 11) installed in the film supply section 102. As shown in FIG. 11, the origin signal-generating means 210 comprises a first origin signal-generating means 212 for generating a first origin signal Sg1 for the full size, and a second origin signal-generating means 214 for generating a second origin signal Sg2 for the half size.

The first origin signal-generating means 212 includes a first pulley 222 which is fixed to the rotary shaft 220 of the driving motor 160 for driving and rotating the suction drum 146, a second pulley 226 to which the rotary driving of the first pulley 222 is transmitted by the aid of a belt 224, and a first circular plate 228 which is rotated together with the second pulley 226.

The second origin signal-generating means 214 includes a third pulley 230 which is fixed to the rotary shaft 220 of the driving motor 160 for driving and rotating the suction drum 146, a fourth pulley 234 to which the rotary driving of the third pulley 230 is transmitted by the aid of a belt 232, and a second circular plate 236 which is rotated together with the fourth pulley 234.

In this embodiment, the respective diameters of the first and second pulleys 222, 226 and the first circular plate 228 of the first origin signal-generating means 212 are designed such that the first circular plate 228 is rotated to make one turn when the lengthy photographic film 110 is transported by the rotation by the suction drum 146 in an amount of "length corresponding to full size and a predetermined additional length".

Similarly, the respective diameters of the third and fourth pulleys 230, 234 and the second circular plate 236 of the second origin signal-generating means 214 are designed such that the second circular plate 236 is rotated to make one turn when the lengthy photographic film 110 is transported by the rotation by the suction drum 146 in an amount of "length corresponding to half size and a predetermined additional length".

An unillustrated unique mark is attached, or a window is formed at each of the first and second circular plates 228, 236, wherein the mark or the window is detectable by each of optical sensors 238, 240 installed around the circumferential edge of each of the circular plates 228, 236.

Therefore, the first circular plate 228 is rotated to make one turn when the suction drum 146 is driven and rotated in the first direction by the driving motor 160, and the lengthy photographic film 110 is transported in the amount of "length corresponding to full size and a predetermined additional length". The second circular plate 236 is rotated to make one turn when the lengthy photographic film 110 is transported in the amount of "length corresponding to half size and a predetermined additional length". Detection signals (origin signals) Sg1, Sg2 are outputted by the aid of the optical sensors 238, 240 respectively. The detection signals Sg1, Sg2, which are supplied from the respective optical sensors 238, 240, are inputted as the first and second origin signals Sg1, Sg2 into the first auxiliary control unit 180.

On the other hand, as shown in FIG. 8, a print head 250 is provided in the vicinity of the suction drum 146, in opposition to the emulsion surface of the lengthy photographic film 110 sucked by the suction drum 146.

The print head 250 comprises a multiple element light-emitting section arranged in a lined configuration in a direction perpendicular to the transport direction of the lengthy photographic film 110, and an optical system for reducing and focusing the light from the multiple element light-emitting section onto an edge portion of the lengthy photographic film 110. The print head 250 constitutes a side print section 252 to serve as the side print means together with the control circuit included in the first auxiliary control unit 180.

The side print section 252 performs the side printing on the lengthy photographic film 110 in accordance with print data Dp inputted from the first auxiliary control unit 180 as well, on the basis of the input of the start signal Ss (see FIG. 12) from the first auxiliary control unit 180. The start signal Ss is generated by a start signal-generating means 260 which is incorporated in the first auxiliary control unit 180.

Figure 12:
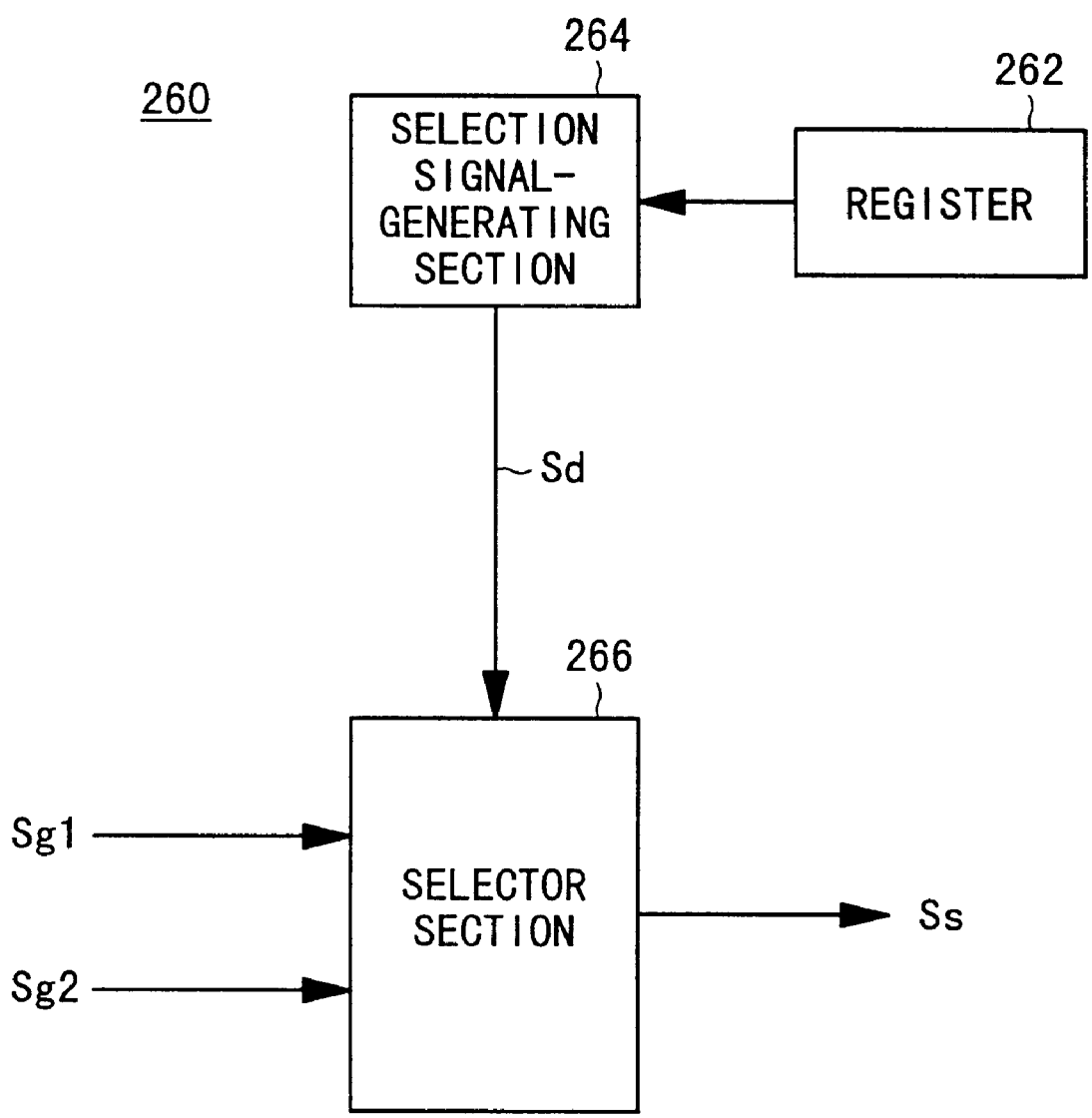
FIG. 12 shows an arrangement of an exemplary start signal-generating means.

As shown in FIG. 12, the start signal-generating means 260 includes a selection signal-generating section 264 for changing the attribute of a selection signal Sd on the basis of the film size (classification information concerning the full size or the half size) stored in a register 262, and a selector section 266 for selecting the origin signal Sg1 or Sg2 corresponding to the attribute of the selection signal Sd, of the first and second origin signals Sg1, Sg2 to be inputted, and outputting the selected signal as the start signal Ss.

In other words, the start signal-generating means 260 selects the origin signal Sg1 or Sg2 corresponding to the current film size, of the inputted first and second origin signals Sg1, Sg2, and it outputs the selected signal as the start signal Ss.

The print data Dp, which is inputted into the side print section 252, is processed as follows. That is, for example, the film information inputted into the main control unit 182 by an operator or the like, the name of production as the production information, and the serial number are fed to the first auxiliary control unit 180, and they are converted into the print data Dp by the first auxiliary control unit 180 to be inputted into the side print section 252.

Accordingly, the side print apparatus 252 can correctly and easily side-print the product name and the serial number based on the print data Dp, on the portion corresponding to the current film size, of the lengthy photographic film 110 transported by the suction drum 146.

The transport belt 150 and the film cutter 148, which are controlled by a second auxiliary control unit 310, are installed on the downstream side of the suction drum 146.

The transport belt 150, which is arranged on the downstream side of the suction drum 146, transports the lengthy photographic film 110 to the film cutter 148 which is arranged on the downstream side. The film cutter 148 includes a movable blade and a fixed blade. The cutting operation is started at the point of time at which the start signal Ss is inputted into the second auxiliary control unit 310 from the first auxiliary control unit 180. The lengthy photographic film 110 is cut into the photographic film strip 18 having the length corresponding to the current film size (full size or half size) while being controlled by the second auxiliary control unit 310.

Figure 13:
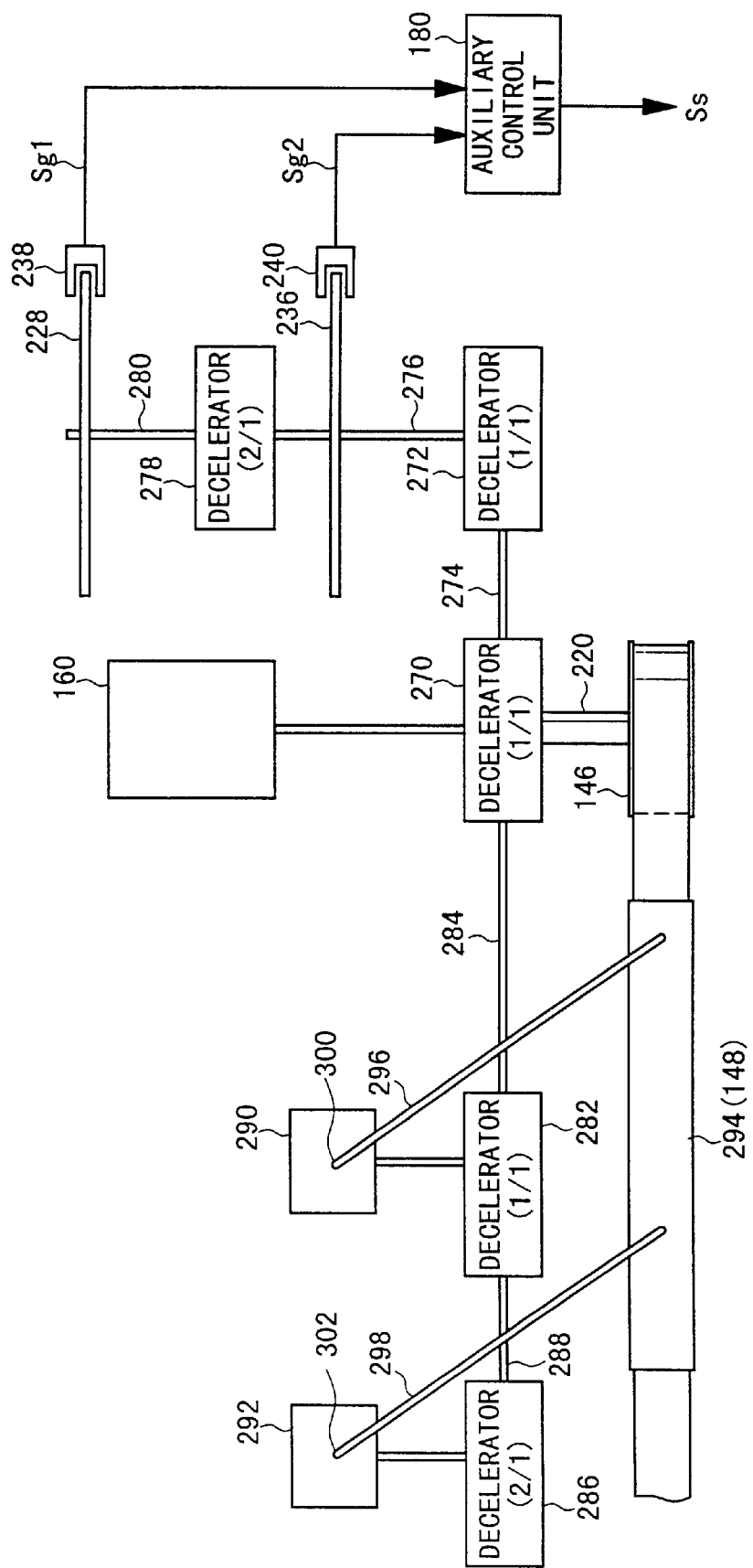
FIG. 13 shows an arrangement of another exemplary origin signal-generating means.
Figure 14:
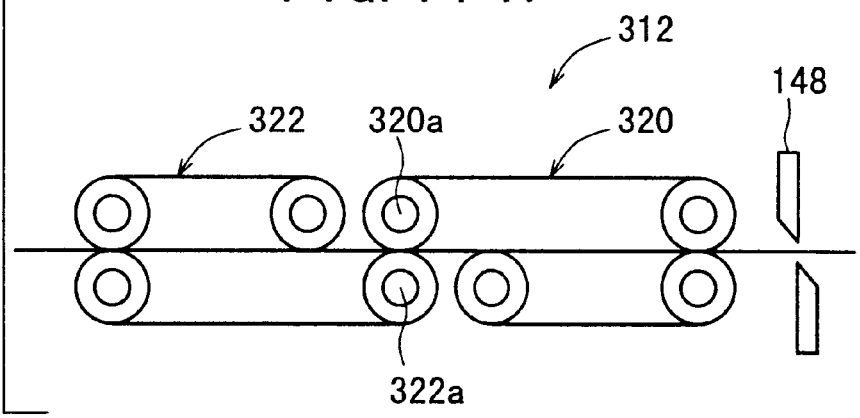
FIG. 14A illustrates a conveyer apparatus of the production apparatus according to the embodiment of the present invention.
FIG. 14B illustrates a conveyer apparatus concerning Comparative Example.
Figure 14:
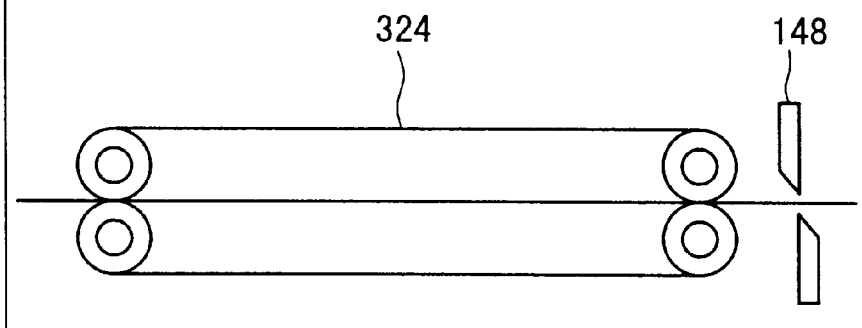

In the illustrative arrangement shown in FIG. 11, the cutting timing for the film cutter 148 is electrically provided on the basis of the input of the start signal Ss into the second auxiliary control unit 310. Alternatively, the cutting timing may be mechanically provided. In this case, as shown in FIG. 13, a first decelerator 270 having an input/output ratio of 1/1 is installed on the rotary shaft 220 of the driving motor of the suction drum 146. A second decelerator 272 having an input/output ratio of 1/1 is coupled to the first decelerator 270, for example, by the aid of a belt driving system 274. Further, a second circular plate 236 and a third decelerator 278 having an input/output ratio of 2/1 are coupled to a rotary shaft 276 of the second decelerator 272. A first circular plate 228 is fixed to a rotary shaft 280 of the third decelerator 278.

An unillustrated unique mark is attached, or a window is formed at each of the first and second circular plates 228, 236, wherein the mark or the window is detectable by each of optical sensors 238, 240 installed around the circumferential edge of each of the circular plates 228, 236.

Accordingly, the second circular plate 236 makes one turn every time when the suction drum 146 makes one turn. The first circular plate 228 makes one turn every time when the suction drum 146 makes two turns. Therefore, if the lengthy photographic film 110 is fed in an amount corresponding to the length of (length of half size photographic film strip 18 and a predetermined additional length) every time when the suction drum 146 makes one turn, then the first origin signal Sg1 corresponding to the full size is outputted from the optical sensor 238 corresponding to the first circular plate 228, and the second origin signal Sg2 corresponding to the half size is outputted from the optical sensor 240 corresponding to the second circular plate 236.

The first decelerator 270, which is attached to the rotary shaft 220 of the driving motor 160, is also operated as follows. That is, a fourth decelerator 282 having an input/output ratio of 1/1 is coupled to the first decelerator 270, for example, by the aid of a belt driving system 284. A fifth decelerator 286 having an input/output ratio of 2/1 is coupled to the fourth decelerator 282, for example, by the aid of a belt driving system 288.

Roller gears 290, 292 are provided on the respective rotary shafts of the fourth and fifth decelerators 282, 286 respectively. Reciprocating arms 296, 298, which extend from a unit 294 (film cutter unit) including the film cutter 148, are selectively coupled to the roller gears 290, 292 via 1-position clutches 300, 302.

That is, when the lengthy photographic film 110 is cut into the photographic film strip 18 having the full size, the roller gear 292 coupled to the fifth decelerator 286 is coupled via the clutch 302 to the arm 298 extending from the film cutter unit 294. Accordingly, the film cutter 148 makes reciprocating movement once every time when the suction drum 146 makes two turns. The lengthy photographic film 110 is cut into the photographic film strip 18 having the full size.

When the lengthy photographic film 110 is cut into the photographic film strip 18 having the half size, the roller gear 290 coupled to the fourth decelerator 282 is coupled via the clutch 300 to the arm 296 extending from the film cutter unit 294. Accordingly, the film cutter 148 makes reciprocating movement once every time when the suction drum 146 makes one turn. The lengthy photographic film 110 is cut into the photographic film strip 18 having the half size.

As described above, the suction drum 146, the origin signal-generating means 210, the start signal-generating means 260 included in the first auxiliary control unit 180, the transport belt 150, and the film cutter 148 function as the film-cutting means for cutting the lengthy photographic film 110 fed from the film roll 116A or 116B into those having the length suitable for the film size (full size or half size) included in the film information.

As shown in FIG. 7, a conveyer apparatus 312, which is controlled by a second auxiliary control unit 310 and which is used to transport the photographic film strip 18 after the cutting to the transport line 108 disposed at the downstream stage, is installed on the downstream side in the transport direction of the film cutter 148. The transport line 108 disposed at the downstream stage comprises a main line 314 for transporting the photographic film strip 18 in the first direction, and a plurality of branched lines 316 branched from the main line 314, for example, for supplying the shield paper strip 20 and supplying the spool 16. The main line 314 comprises a plurality sets of transport belts. Each of the branched lines 316 has its transport passage which comprises transport belts up to a tape-sticking section 332 as described later on. A tape-sticking transport apparatus 510 is installed for each of the branched lines 316.

The photographic film strip 18 is allotted from the main line 314 to the branched line 316 by the aid of a selector section 318 installed on the main line 314. The selector section 318 allots the photographic film strip 18 successively fed one by one to the main line 314 and the branched line 316 in accordance with the control of the second auxiliary control unit 310.

On the other hand, as shown in FIG. 14A, the conveyer apparatus 312 comprises two conveyers (upstream side conveyer 320 and downstream side conveyer 322). The lengths of the conveyers 320, 322 are as follows. That is, the length of the upstream side conveyer 320 is a length of (length of half size photographic film strip 18 and a predetermined additional length). The total length of the upstream side conveyer 320 and the downstream side conveyer 322 is the same as the length of (length of full size photographic film strip 18 and a predetermined additional length).

If the photographic film strip 18 currently transported is of the full size, the second auxiliary control unit 310 synchronously drives the conveyers 320, 322 to drive and rotate them as an integrated conveyer.

Specifically, when the lengthy photographic film 110 is transported in an amount of certain length (length corresponding to the full size in this case) by the transport belt 150 and the conveyer apparatus 321 during the period in which both of the conveyers 320, 322 are operated at a high speed, i.e., at the point of time at which the start signal Ss is inputted from the first auxiliary control unit 180 into the second auxiliary control unit 310, the second auxiliary control unit 310 makes control such that the transport operation for the lengthy photographic film 110 by the transport belt 150 and the conveyer apparatus 312 is performed at a low speed. Subsequently, the lengthy photographic film 110 is cut at the necessary position by the film cutter 148. Thus, the photographic film strip 18 having the full size is produced.

During this process, the photographic film strip 18 exists over a range from the upstream side conveyer 320 to the downstream side conveyer 322.

At the point of time at which the cutting of the lengthy photographic film 110 is completed, the second auxiliary control unit 310 synchronously drives the respective conveyers 320, 322 of the conveyer apparatus 312 to transport the full size photographic film strip 18 at a high speed. In accordance with the transport, the next lengthy photographic film 110 is transported to the conveyer apparatus 312 by the aid of the transport belt 150.

In other words, the control is made as follows. That is, both of the respective conveyers 320, 322 of the conveyer apparatus 312 perform the low speed transport when the lengthy photographic film 110 is cut. At the point of time at which the full size photographic film strip 18 is obtained after the completion of the cutting of the lengthy photographic film 110, the photographic film strip 18 is transported at the high speed.

The second auxiliary control unit 310 is operated as follows. That is, when the photographic film strip currently transported is of the half size, the high speed transport control for the photographic film strip 18 is always effected for the downstream side conveyer 322, and the low speed transport control and the high speed transport control for the photographic film strip 18 are effected for the upstream side conveyer 320.

Specifically, when the lengthy photographic film 110 is transported at the high speed in a certain length (length corresponding to the half size in this case) by the transport belt 150 and the upstream side conveyer 320 during the period in which both of the conveyers 320, 322 are operated at a high speed, i.e., at the point of time at which the start signal Ss is inputted from the first auxiliary control unit 180 into the second auxiliary control unit 310, the second auxiliary control unit 310 makes control such that the transport belt 150 is stopped, and the transport operation for the lengthy photographic film 110 effected by the upstream side conveyer 320 is performed at a low speed. Subsequently, the lengthy photographic film 110 is cut at the necessary position by the film cutter 148. Thus, the photographic film strip 18 having the half size is produced. During the cutting operation, the photographic film strip 18 of the half size, which is located on the downstream side conveyer 322, is transported at a high speed to the transport line 108 disposed at the downstream stage.

When the cutting is completed, the upstream side conveyer 320 and the downstream side conveyer 322 are subjected to the high speed transport driving again. Accordingly, the currently cut photographic film strip 18 is transported at a high speed to the downstream side conveyer 322. Simultaneously, the next lengthy photographic film 110 is transported at a high speed to the upstream side conveyer 320 by the aid of the transport belt 150. The photographic film strip 18 of the half size is successively transported to the transport line 108 disposed at the downstream stage by repeating the series of operations described above.

An illustrative structure of the conveyer apparatus 312 will now be considered. For example, as shown in FIG. 14B, if the conveyer apparatus 312 is constructed by one conveyer 324 having a transport passage length which is approximately the same as the length of the photographic film strip 18 (Comparative Example), then no problem arises when the full size photographic film strip 18 is transported, but the following problem arises when the half size photographic film strip 18 is transported.

That is, the half size photographic film strip 18 has the length which is the half of that of the full size. Therefore, the previously cut photographic film strip 18 exists on a downstream portion of the conveyer 324 during the period in which the lengthy photographic film 110 is cut. Therefore, when the cutting is performed while stopping the transport effected by the conveyer 324, the transport of the previously cut photographic film strip 18 is also stopped. The number of processed products per unit time (throughput) is decreased corresponding thereto. As a result, it is impossible to improve the production efficiency.

On the contrary, in the case of the production apparatus 100 according to the embodiment of the present invention, the conveyer apparatus 312 is divided into two, i.e., into the upstream side conveyer 320 and the downstream side conveyer 322 to individually control the respective conveyers 320, 322. Therefore, the previously cut photographic film strip 18 can be transported at the high speed to the transport line 108 disposed at the downstream stage during the period in which the lengthy photographic film 110 is cut. Thus, it is possible to improve the throughput and improve the production efficiency corresponding thereto.

Especially, in this embodiment, the apparatus is constructed such that the downstream side roller 320a of the upstream side conveyer 320 is located over the upstream side roller 322a of the downstream side conveyer 322. Accordingly, the half size photographic film strip 18, which exists on the upstream side conveyer 320, is smoothly transported to the downstream side conveyer 322. Thus, it is easy to realize the high speed transport of the photographic film strip 18.

As described above, the conveyer apparatus 312 functions as the transport operation-changing means for changing the transport operation for the photographic film strip 18 depending on the film size.

The production apparatus 100 according to this embodiment further comprises a tape-sticking section 332 which is installed for each of the branched lines 316 and which is controlled by a third auxiliary control unit 330.

The tape-sticking section 332 is used to stick the adhesive tape 32 (see FIG. 2) to the rearward end (forward end in product form) of the photographic film strip 18 in the transport direction. The third auxiliary control unit 330 comprises a variety of control circuits, and it is controlled by the main control unit 182 which controls the entire production apparatus 100. Further, the third auxiliary control unit 330 appropriately inputs obtained data into the main control unit 182.

Three transport roller pairs 340a to 340c, which constitute the tape-sticking transport apparatus 510, are installed at the downstream stage of the tape-sticking section 332 disposed on the branched line 316. The three transport roller pairs 340a to 340c are controlled by the third auxiliary control unit 330.

A first optical sensor 346 for detecting the forward end of the photographic film strip 18 is installed on the downstream side of the third transport roller pair 340c. A second optical sensor 348 for detecting the forward end of the photographic film strip 18 is installed on the downstream side of the second transport roller pair 340b.

The distance from the tape-sticking section 332 to the first optical sensor 346 is approximately the same as the length of the full size photographic film strip 18. The distance from the tape-sticking section 332 to the second optical sensor 348 is approximately the same as the length of the half size photographic film strip 18.

The transport is stopped at the point of time at which the forward end of the photographic film strip 18 in the transport process is detected by the first optical sensor 346. At this time, the rearward end of the full size photographic film strip 18 is located at the tape-sticking section 332.

The transport is stopped at the point of time at which the forward end of the photographic film strip 18 in the transport process is detected by the second optical sensor 348. At this time, the rearward end of the half size photographic film strip 18 is located at the tape-sticking section 332.

The first optical sensor 346 is always in the enable state. However, the second optical sensor 348 is in the enable state only when the half size photographic film strip 18 is transported.

On the other hand, the tape-sticking section 332 draws a release paper sheet 352 stuck with the adhesive tape 32, from a release paper roll 350 wound in a rolled configuration. The adhesive tape 32 is peeled off from the release paper sheet 352, and it is glued to the rearward end of the photographic film strip 18.

The bar code 34, which indicates the film information, is previously printed on the adhesive tape 32 supplied to the tape-sticking section 332. However, a printer for printing the bar code may be provided for the tape-sticking section 332, and the bar code 34 may be printed on the adhesive tape 32 during the production of the photographic roll film 10.

A bar code reader 354 for reading the bar code 34 of the adhesive tape 32 is arranged at a position opposed to the adhesive tape 32 drawn in the vicinity of the release paper roll 350. The bar code reader 354 outputs the contents of the read bar code 34 to the third auxiliary control unit 330. The third auxiliary control unit 330 converts the contents of the bar code 34 into the film information which is outputted to the main control unit 182.

The three sets of the transport roller pairs 340a to 340c are movable in the direction to make approach to the transport passage and in the direction to make separation from the transport passage, by the aid of first to third movement drive mechanisms 356a to 356c corresponding thereto respectively. The three movement drive mechanisms 356a to 356c are controlled by the third auxiliary control unit 330 as well.

When the full size photographic film strip 18 is transported, the second and third transport roller pairs 340b, 340c are firstly moved in the direction to make separation from the transport passage by the aid of the second and third movement drive mechanisms 356b, 356c. The photographic film strip 18 is transported by the first transport roller pair 340a.

At the point of time at which the rearward end of the photographic film strip 18 is positioned at the tape-sticking section 332, the transport of the photographic film strip 18 is once stopped in accordance with the output of the detection signal from the first optical sensor 346. The adhesive tape 32 is stuck by the aid of the tape-sticking section 332. After that, the first transport roller pair 340a is moved in the direction to make separation from the transport passage by the aid of the first movement drive mechanism 356a, simultaneously with which the third transport roller pair 340c is moved in the direction to make approach to the transport passage by the aid of the third movement drive mechanism 356c. The photographic film strip 18 is transported by the third transport roller pair 340c.

On the other hand, when the half size photographic film strip 18 is transported, the second and third transport roller pairs 340b, 340c are firstly moved in the direction to make separation from the transport passage by the aid of the second and third movement drive mechanisms 356b, 356c. The photographic film strip 18 is transported by the first transport roller pair 340a.

At the point of time at which the rearward end of the photographic film strip 18 is positioned at the tape-sticking section 332, the transport of the photographic film strip 18 is once stopped in accordance with the output of the detection signal from the second optical sensor 348. The adhesive tape 32 is stuck by the aid of the tape-sticking section 332.

After that, the first transport roller pair 340a is moved in the direction to make separation from the transport passage by the aid of the first movement drive mechanism 356a, simultaneously with which the second transport roller pair 340b is moved in the direction to make approach to the transport passage by the aid of the second movement drive mechanism 340b. The photographic film strip 18 is transported by the second transport roller pair 340b.

Subsequently, the transport of the photographic film strip 18 is stopped again in accordance with the output of the detection signal from the first optical sensor 346. The second transport roller pair 340b is moved in the direction to make separation from the transport passage by the aid of the second movement drive mechanism 356b simultaneously with which the third transport roller pair 340c is moved in the direction to make approach to the transport passage by the aid of the third movement drive mechanism 356c. After passage of a predetermined period of time, the photographic film strip 18 is transported to the downstream stage by the third transport roller pair 340c.

As described above, the three transport roller pairs 340a to 340c are installed for the transport system disposed at the downstream stage of the tape-sticking section 332.

The three transport roller pairs 340a to 340c are appropriately switched depending on the transport state of the photographic film strip 18. Further, the second optical sensor 348 for detecting the half size photographic film strip 18 is installed on the downstream side of the second transport roller pair 340b. Therefore, the adhesive tape 32 can be easily stuck and the transport to the downstream stage can be easily performed not only for the full size photographic film strip 18 but also for the half size photographic film strip 18.

That is, the first and second optical sensors 346, 348 and the first to third transport roller pairs 340a to 340c for constructing the tape-sticking transport apparatus 510 function as the timing-changing means for changing the transport timing depending on the film size of the photographic film strip 18 during the transport of the photographic film strip 18 to the winding section 106.

Figure 15:
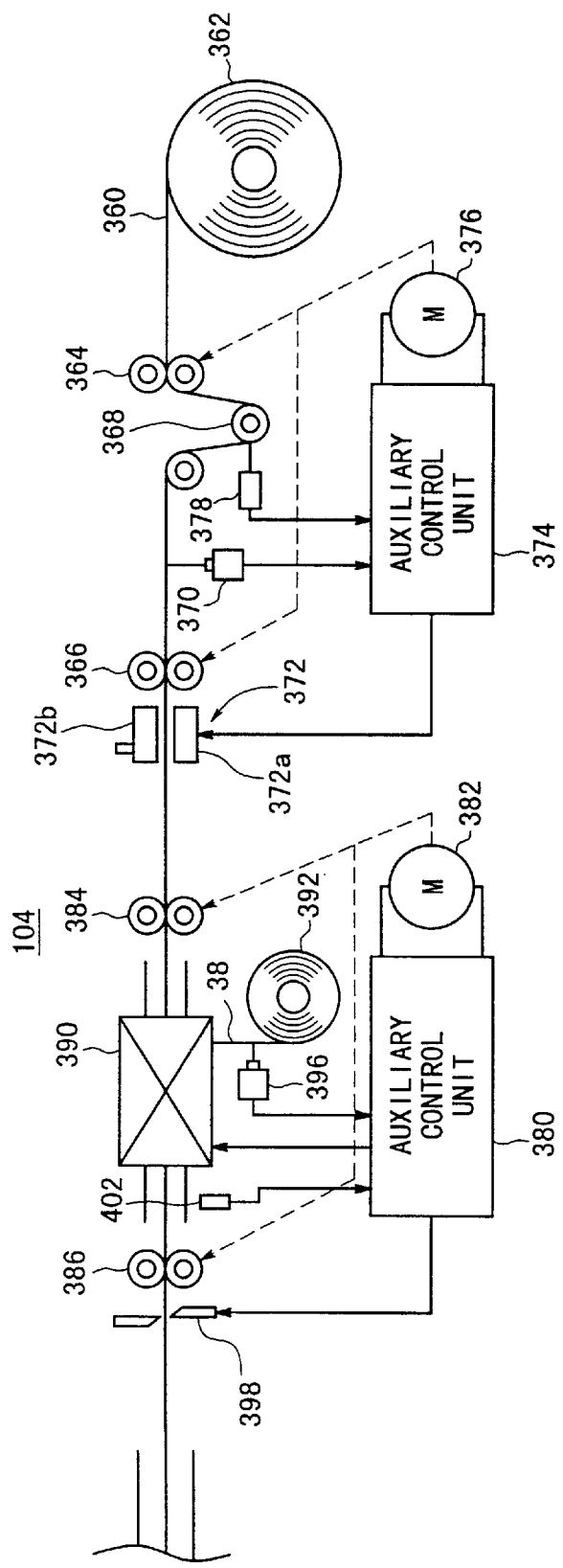
FIG. 15 shows an arrangement of a shield paper supply section of the production apparatus according to the embodiment of the present invention.

Next, as shown in FIG. 15, a shield paper roll 362, around which a lengthy shield paper sheet 360 is wound in a rolled configuration, is arranged in the shield paper supply section 104. The shield paper roll 362 is previously printed with the shield paper strip 20 in a continuous manner, and it is subjected to the transport in the leftward direction in FIG. 15 in a state in which the back surface side is directed upwardly with the rearward end 20b of the shield paper strip 20 disposed forward.

Transport roller pairs 364, 366, a dancer roller 368, a CCD camera 370, and a trimming section 372 are arranged along the transport passage. These components are controlled by a fourth auxiliary control unit 374 comprising various control circuits. The fourth auxiliary control unit 374 is controlled by the main control unit 182 which controls the entire production apparatus 100. The fourth auxiliary control unit 374 appropriately inputs obtained data into the main control unit 182.

The transport roller pair 364 is provided to make rotation with the lengthy shield paper sheet 360 interposed thereby so that the lengthy shield paper sheet 360 is drawn from the shield paper roll 362. The transport roller pair 364 is driven and rotated by a motor 376 which is connected to the fourth auxiliary control unit 374. The dancer roller 368 is movable in the upward and downward directions.

Although not shown, the dancer roller 368 is pulled downwardly by the aid of the self-weight. The dancer roller 368 may be pulled downwardly by using a spring. A sensor 378 for detecting the downward movement of the dancer roller 368 is provided in the vicinity of the dancer roller 368. A detection signal from the sensor 378 is inputted into the fourth auxiliary control unit 374.

The CCD camera 370 is a means for reading the film information previously printed on the lengthy shield paper sheet 360. The CCD camera 370 is arranged opposing to the surface of the lengthy shield paper sheet 360. The CCD camera 370 photographs the film information on the lengthy shield paper sheet 360 which is transported by the transport roller pair 366. The photographed image data is converted into character data. The film information corresponding to the character data is inputted into the main control unit 182.

The trimming section 372 is a means for trimming the contour of the lengthy shield paper sheet 360, and it comprises a die section 372a and a punch section 372b. The lengthy shield paper sheet 360 is treated by the trimming section 372 as follows. That is, the portions, which correspond to the forward end 20a and the rearward end 20b of the shield paper strip 20, are trimmed to have a narrow width, and the fastening hole 30 is bored.

Those arranged on the downstream side of the trimming section 372 are two transport roller pairs 384, 386 which are driven and rotated by a motor 382 controlled by a fifth auxiliary control unit 380, and a seal-sticking section 390 which is controlled by the fifth auxiliary control unit 380. The seal-sticking section 390 sticks the enclosing seal 38 to a portion in the vicinity of the rearward end 20b of the shield paper strip 20 printed on the lengthy shield paper sheet 360.

The fifth auxiliary control unit 380 comprises a variety of control circuits, and it is controlled by the main control unit 182 which controls the entire production apparatus 100. The fifth auxiliary control unit 380 appropriately inputs obtained data into the main control unit 182.

The seal-sticking section 390 draws the enclosing seal 38 from a roll 392 around which the band-shaped enclosing seal 38 are wound in a rolled configuration. The enclosing seal 38 is cut to have a predetermined width, followed by being thermally glued onto the surface of the lengthy shield paper sheet 360.

A CCD camera 396 for reading the film information previously printed on the enclosing seal 38 is arranged at a position opposed to the enclosing seal 38 drawn in the vicinity of the roll 392. The CCD camera 396 photographs the name of product and the process number as the film information printed on the enclosing seal 38. The photographed image data is inputted into the fifth auxiliary control unit 380. The fifth auxiliary control unit 380 converts the inputted photographed image data into character data. The film information corresponding to the character data is inputted into the main control unit 182.

A shield paper cutter 398 for cutting the lengthy shield paper sheet 360 into the shield paper strip 20 is arranged on the downstream side of the seal-sticking section 390. The shield paper cutter 398 comprises a movable blade and a fixed blade, and it is controlled by the fifth auxiliary control unit 380.

The distance between the shield paper cutter 398 and a third station ST3 of the winding section 106 described later on is approximately the same as the length of the shield paper strip 20 corresponding to the full size.

An optical sensor 402, which is used to detect the boundary position of the trimming portion of the lengthy shield paper sheet 360 when the shield paper strip 20 corresponding to the half size is produced, is installed between the seal-sticking section 390 and the shield paper cutter 398. Setting is made such that when the boundary portion of the trimming portion of the lengthy shield paper sheet 360 is detected by the optical sensor 402, the portion of the shield paper strip 20, to which the enclosing seal 38 is to be stuck, arrives at the seal-sticking section 390.

The optical sensor 402 is in the enable state only when the shield paper strip 20 corresponding to the half size is transported.

When the shield paper strip 20 corresponding to the full size is produced, the transport is once stopped at a point of time at which the lengthy shield paper sheet 360 is transported by a predetermined length corresponding to the full size, i.e., at a point of time at which the forward end of the lengthy shield paper sheet 360 reaches the third station ST3 of the winding section 106. The cutting is performed by the shield paper cutter 398. Simultaneously, the seal-sticking section 390 sticks the enclosing seal 38 to the shield paper strip 20. At the point of time at which the cutting by the shield paper cutter 398 is completed, the shield paper strip 20 is transported to the downstream line.

When the shield paper strip 20 corresponding to the half size is produced, the shield paper strip 20 corresponding to the half size is transported to the downstream line by the aid of the transport roller pair 386.

The optical sensor 402 is in the enable state. At a point of time at which the boundary position of the trimming portion of the lengthy shield paper sheet 360 is detected by the optical sensor 402, the transport of the lengthy shield paper sheet 360 is once stopped. The enclosing seal 38 is stuck by the seal-sticking section 390. After that, the transport of the lengthy shield paper sheet 360 is started again. At a point of time at which the lengthy shield paper sheet 360 is transported by a predetermined length corresponding to the half size, the transport is once stopped. The cutting is performed by the shield paper cutter 398 (cutting at the boundary position of the trimming portion).

As described above, the optical sensor 402 for detecting the shield paper strip (boundary of the trimming portion of the lengthy shield paper sheet) corresponding to the half size is installed between the seal-sticking section 390 and the shield paper cutter 398. Therefore, the enclosing seal 38 can be easily stuck, and the transport to the downstream stage can be easily performed not only for the full size shield paper strip 20 but also for the half size shield paper strip 20.

In other words, the optical sensor 402 functions as the timing-changing means for changing the transport timing depending on the film size of the photographic film strip 18 during the transport of the shield paper strip 20 to the winding section 106.

Figure 16:
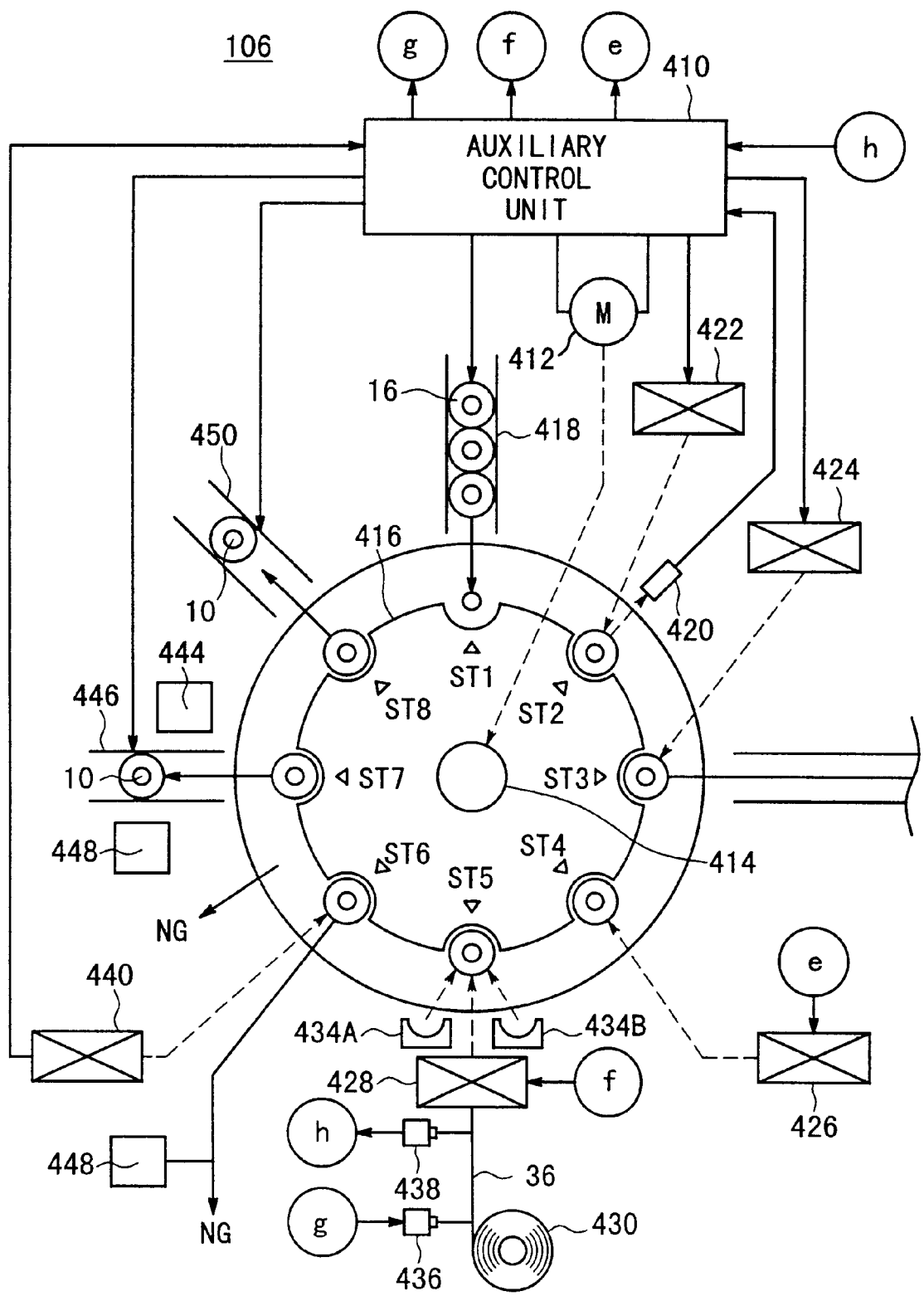
FIG. 16 shows an arrangement of a winding section of the production apparatus according to the embodiment of the present invention.

Next, as shown in FIG. 16, the winding section 106 comprises a circular plate-shaped spool turret 416 which is rotated intermittently about the center of a shaft 414 by a motor 412 controlled by a sixth auxiliary control unit 410, and respective apparatus sections which are arranged on the outer circumference of the spool turret 416. The sixth auxiliary control unit 410 comprises a variety of control circuits, and it is controlled by the main control unit 182 which controls the entire production apparatus 100. The fifth auxiliary control unit 410 appropriately inputs obtained data into the main control unit 182.

The spool turret 416 is rotatably attached to the shaft 414, and it is rotated intermittently by 450 in the clockwise direction in FIG. 16 by means of the motor 412. The spool turret 416 is provided with eight spool holders. The respective spool holders are stopped at positions at which a first station to an eighth station ST8 are provided to perform various operations for the spool 16.

In the first station ST1, the spool 16, which is produced in another line and transported therefrom, is set to the spool holder 418.

The second station ST2 is installed with an appearance inspection station 420 for inspecting the appearance (bending, breakage) of the supplied spool 16, and a spool-positioning section 422 for making positioning such that the slit 24 (see FIG. 3) of the spool 16 having been decided to be good in the appearance inspection station 420 is directed at a predetermined position.

The appearance inspection for the spool 16 may be performed, for example, in the sixth station ST6. However, when the spool 16 is inspected before the photographic film strip 18 and the shield paper strip 20 are wound therearound, it is possible to prevent the photographic film strip 18 and the shield paper strip 20 from being wound around the spool 16 having any defective appearance. Thus, it is possible to avoid unnecessary loss of the photographic film strip 18 and the shield paper strip 20.

The third station ST3 is installed with a winding mechanism 424 for winding the shield paper strip 20 and the photographic film strip 18 around the spool 16. The forward end (rearward end in the product form) of the lengthy shield paper sheet 360 transported by the transport roller pair 386 is inserted into the slit 24 of the spool 16 positioned in the second station ST2.

In the case of the full size, when the forward end of the lengthy shield paper sheet 360 is inserted into the slit 24, the winding mechanism 424 rotates the spool 16 to make several turns in the winding direction in this state so that the rearward end 20b of the shield paper strip 20 of the full size or the half size is wound around the spool 16.

When the shield paper strip 20 is slightly wound around the spool 16, the photographic film strip 18, which is transported via the branched line 316, is superimposed on the back surface of the shield paper strip 20.

The winding mechanism 424 further rotates the spool 16 in the winding direction to wind the shield paper strip 20 and the photographic film strip 18 around the spool 16. During this process, the adhesive tape 32, which is glued to the rearward end of the photographic film strip 18, is stuck to the back surface of the shield paper strip 20 to fix the photographic film strip 18 to the shield paper strip 20. The lengthy shield paper sheet 360 is cut by the shield paper cutter 398 to give the shield paper strip 20.

The spool 16, around which the photographic film strip 18 and the shield paper strip 20 are wound in the third station ST3, is transported to the next fourth station ST4 in accordance with the rotation of the spool turret 416, while being held so that the shield paper strip 20 does not cause any winding looseness. In the fourth station ST4, the forward end 20a of the shield paper strip 20 is folded inwardly by a folding section 426.

The fifth station ST5 is arranged with a seal-winding section 428 for winding the opening seal 36 around the outer circumference of the shield paper strip 20. The seal-winding section 428 draws the opening seal 36 from a roll 430 around which the band-shaped opening seal 36 is wound in a rolled configuration. The opening seal 36 is cut to have a predetermined width, and then it is wound around the outer circumference of the shield paper strip 20.

The seal-winding section 428 is provided with two types of heat blocks 434A, 434B for thermally gluing the opening seal 36 to the outer circumference of the shield paper strip 20. Each of the heat blocks 434A, 434B has a semicircular recess which conforms to the outer diameter of the shield paper strip 20 wound around the spool 16. That is, the full size shield paper strip 20 is longer than the half size shield paper strip 20. Therefore, the outer diameter of the full size shield paper strip 20 after being wound around the spool 16 is larger than that of the half size. Therefore, in the embodiment of the present invention, there are provided the heat block 434A corresponding to the full size, and the heat block 434B corresponding to the half size. The heat blocks 434A, 434B are exchanged with each other depending on the film size to be processed.

Accordingly, it is possible to reliably stick the adhesive tape 32 in conformity with the film size. It is possible to effectively avoid any winding looseness of the photographic film strip 18 and the shield paper strip 20.

A print head 436 of an ink-jet printer is arranged at a position opposed to the drawn opening seal 36 in the vicinity of the roll 430. The print head 436 comprises ink nozzles arranged in a lined configuration in a direction orthogonal to the transport direction of the opening seal 36, and an ink discharge mechanism for discharging ink from the ink nozzles. The print head 436 constitutes the printing section together with the control circuit included in the sixth auxiliary control unit 410. A thermal transfer printer may be used in place of the ink-jet printer.

The printing section prints the serial number on the opening seal 36 in accordance with the inputted print data. The print data to be inputted into the printing section includes, for example, the serial number as the production information inputted into the main control unit 182 by an operator or the like. The data is fed to the sixth auxiliary control unit 410, and it is converted into the print data by the sixth auxiliary control unit 410, followed by being inputted into the printing section.

A CCD camera 438 for reading the film information previously printed on the opening seal 36 is arranged in the vicinity of the print head 436. The CCD camera 438 photographs the product name as the film information printed on the opening seal 36. The photographed image data is outputted to the sixth auxiliary control unit 410. The sixth auxiliary control unit 410 converts the inputted photographed image data into character data. The film information corresponding to the character data is inputted into the main control unit 182.

The sixth station ST6 is provided with an information-detecting section 440 for detecting a result of collation between the production information and the film information of the photographic roll film 10, and a selecting mechanism 442 for discharging the photographic roll film 10 to the outside of the apparatus if an inconsistent result of collation is obtained in the information-detecting section 440.

The seventh station ST7 is provided with a winding diameter-measuring section 444 for measuring the winding diameter, and a selecting mechanism 448 for transporting the photographic roll film 10 judged to be good to the next stacking section 446, and discharging the photographic roll film 10 judged to be defective to the outside of the apparatus. The winding diameter-measuring section 444 may be provided at an intermediate position of the transport passage to the stacking section 446.

The eighth station ST8 is provided with a stacking section 450 for recovering remained products (photographic roll film 10) which could not be selected by the selecting mechanism 448 of the seventh station ST7.

Next, the operation of the production apparatus 100 according to the embodiment of the present invention will be explained with reference to FIGS. 7, 8, 15, and 16.

At first, the operator performs the following setting. That is, the film rolls 116A, 116B, which are used for the photographic roll film 10 to be produced, are set to the film supply section 102. The release paper roll 350 is set to the tape-sticking section 332. The shield paper roll 362 is set to the shield paper supply section 104. Similarly, the roll 392 of the opening seal 38 is set to the seal-sticking section 390, the spool 16 is set to the winding section 106, and the roll 430 of the opening seal 36 is set to the seal-winding section 428.

The operator inputs the film type, the product name, and the serial number as the film information and the production information to be side-printed and printed on the lengthy photographic film 110 and the opening seal 36. Further, the operator instructs the main control unit 182 to start the production.

The main control unit 182 supplies, to the first auxiliary control unit 180, for example, the film type, the product name, and the serial number of the photographic roll film 10 to be currently produced. The first auxiliary control unit 180 operates the switching apparatus 142 in accordance with the control of the main control unit 182 to select any film roll 116A or 116B of the first and second film rolls 116A, 116B. The following description will be conveniently made for a case in which the film roll 116B is selected.

The rotary shaft 114 of the film roll 116B selected by the first auxiliary control unit 180 is driven and rotated. The lengthy photographic film 110 is fed from the film roll 116B in accordance with the rotation of the rotary shaft 114. The lengthy photographic film 110 passes through the dancer roller section 118, and it is transported in the direction toward the suction drum 146 and the film cutter 148. During this process, the film roll 116B is rotated in the number of revolution corresponding to the winding diameter of the film roll 116B by the aid of the rotation control means 190 (see FIG. 9 or 10) incorporated in the first auxiliary control unit 180 to continuously feed the lengthy photographic film 110.

The lengthy photographic film 110, which is transported to the suction drum 146, is allowed to make tight contact with the circumferential surface of the suction drum in accordance with the suction of air effected by the suction drum 146. The lengthy photographic film 110 is transported so as not to cause any slip. The product name and the serial number as the production information and the film information inputted into the main control unit 182 are converted into the printing data Dp by the first auxiliary control unit 180.

The print head 250 side-prints, for example, the product name, the serial number, and the frame number on the end edge of the lengthy photographic film 110 transported by the suction drum 146, on the basis of the printing data Dp. The side printing is performed on the basis of the input of the start signal Ss from the first auxiliary control unit 180 based on the first and second origin signals Sg1, Sg2 supplied from the origin signal-generating means 210 (see FIG. 11 or 13).

The lengthy photographic film 110, which has been subjected to the side printing, is transported to the film cutter 148 by means of the transport belt 150. The film cutter 148 cuts the lengthy photographic film 110 into those having the length corresponding to the film size on the basis of the input of the start signal Ss from the first auxiliary control unit 180 into the second auxiliary control unit 310 or in accordance with the mechanical timing obtained by the respective decelerators shown in FIG. 13 to obtain the photographic film strip 18 (full size or half size) having the predetermined length corresponding to the number of frames capable of performing the photographing operation.

The photographic film strip 18, which has been cut to have the prescribed length, is transported to the selector section 318 by the aid of the conveyer apparatus 312.

During this process, the conveyer apparatus 312 is controlled as follows. That is, when the full size photographic film strip 18 is transported, both of the upstream side conveyer 320 and the downstream side conveyer 322 make the low speed transport operation during the cutting. At the point of time at which the cutting of the lengthy photographic film 110 is completed to give the full size photographic film strip 18, the photographic film strip 18 is subjected to the high speed transport by the upstream side conveyer 320 and the downstream stage conveyer 322.

Alternatively, the conveyer apparatus 312 is controlled as follows. That is, when the half size photographic film strip 18 is transported, the upstream side conveyer 320 is subjected to the low speed transport operation during the cutting. The downstream side conveyer 322 transports the previously cut half size photographic film strip 18 at the high speed to the line disposed at the downstream stage. At the point of time at which the cutting process is completed, both of the upstream side conveyer 320 and the downstream side conveyer 322 are subjected to the high speed transport control. Thus, the currently cut photographic film strip 18 is transported to the downstream side conveyer 322.

The photographic film strip 18, which is transported by the conveyer apparatus 312, is allotted by the next selector section 318 to those transported to the main line 314 and the branched line 316. The photographic film strip 18, which is fed to the branched line 316, is transported to the tape-sticking section 332.

In the tape-sticking section 332, the following process is performed. That is, the release paper sheet 352 is drawn from the release paper roll 350. The adhesive tape 32 is peeled off from the release paper sheet 352, and it is stuck to the rearward end (forward end of the product) in the transport direction of the photographic film strip 18.

In the tape-sticking section 332, the bar code 34, which is printed on the adhesive tape 32 drawn from the release paper roll 350, is read by the bar code reader 354. The bar code reader 354 outputs the contents of the read bar code 34 to the third auxiliary control unit 330. The third auxiliary control unit 330 converts the contents of the bar code 34 into the film information which is inputted into the main control unit 182.

When the photographic film strip 18 is of the full size, it is transported by the first transport roller pair 340a. The transport is stopped at the point of time at which the forward end of the upstream side thereof is detected by the first optical sensor 346. At this point of time, the adhesive tape 32 is stuck to the rearward end (forward end of the product) in the transport direction of the photographic film strip 18. After that, the photographic film strip 18 is transported to the winding section 106 by the third transport roller pair 340c.

When the photographic film strip 18 is of the half size, it is firstly transported by the first transport roller pair 340a. The transport is stopped at the point of time at which the forward end of the upstream side is detected by the second optical sensor 348. At this point of time, the adhesive tape 32 is stuck to the rearward end (forward end of the product) in the transport direction of the photographic film strip 18. Subsequently, the photographic film strip 18 is transported by the second transport roller pair 340b. The transport is stopped at the point of time at which the forward end of the upstream side is detected by the first optical sensor 346. After that, the photographic film strip 18 is transported to the winding section 106 by the third transport roller pair 340c.

The shield paper supply section 104 is also operated simultaneously with the operation of the film supply section 102. The fourth auxiliary control unit 374 drives and rotates the transport roller pairs 364, 366 by using the motor 376 under the control thereof, in accordance with the control of the main control unit 182. The transport roller pair 364 makes rotation while interposing the lengthy shield paper sheet 360 to draw the lengthy shield paper sheet 360 from the shield paper roll 362. Accordingly, the dancer roller 368 is moved downwardly by the urging action of the spring or the weight of the dancer roller 368, and the dancer roller 368 is detected by the sensor 378.

The detection signal of the sensor 378 is inputted into the fourth auxiliary control unit 374. The fourth auxiliary control unit 374 stops the rotation of the transport roller pair 366 on the basis of the detection signal, and it rotates the transport roller pair 366. Accordingly, the lengthy shield paper sheet 360 having the certain length, which is allowed to stay in accordance with the movement of the dancer roller 368, is transported to the trimming section 372.

The lengthy shield paper sheet 360 is photographed by the CCD camera 370 to obtain the film information 50, 52, 54, 56 (see FIGS. 5 and 6) during the transport to the trimming section 372. The photographed image data obtained by the CCD camera 370 is inputted into the fourth auxiliary control unit 374. The fourth auxiliary control unit 374 converts the inputted photographed image data into the character data. The film information corresponding to the character data is inputted into the main control unit 182.

In the trimming section 372, the pump section 372*b* is moved downwardly to interpose the lengthy shield paper sheet 360 together with the die section 372*a*. The portions corresponding to the forward end 20*a* and the rearward end 20*b* of the printed shield paper strip 20 are subjected to the trimming to give the narrow width. Further, the fastening hole 30 is bored.

The lengthy shield paper sheet 360, which has been subjected to the trimming in the trimming section 372, is transported to the seal-sticking section 390 by the aid of the transport roller pair 384. In the seal-sticking section 390, the enclosing seal 38 is drawn from the roll 392, and it is cut to have the predetermined width to be stuck to the surface of the lengthy shield paper sheet 360.

In the seal-sticking section 390, the product name and the process number, which are printed on the enclosing seal 38 drawn from the roll 392, are photographed by the CCD camera 396. The CCD camera 396 outputs the photographed image data to the fifth auxiliary control unit 380. The fifth auxiliary control unit 380 converts the inputted photographed image data into the character data. The film information corresponding to the character data is inputted into the main control unit 182.

When the shield paper strip 20 is of the type corresponding to the full size, the cutting is performed by the shield paper cutter 398 to give the shield paper strip 20 at the point of time at which the shield paper strip 20 is transported in the predetermined length corresponding to the full size. Simultaneously, the enclosing seal 38 is stuck to the surface of the shield paper strip 20.

When the shield paper strip 20 is of the type corresponding to the half size, the transport is firstly stopped at the point of time at which the trimmed portion at the forward end on the upstream side of the shield paper strip 20 is detected by the optical sensor 402. At this point of time, the enclosing seal 38 is stuck to the surface of the lengthy shield paper sheet 360. After that, the transport is started again. The cutting is performed by the shield paper cutter 398 at the point of time at which the lengthy shield paper sheet 360 is transported in the predetermined length corresponding to the half size.

The winding section 106 is also operated simultaneously with the operation of the film supply section 102 and the shield paper supply section 104. The sixth auxiliary control unit 410 intermittently rotates the spool turret 416 in the clockwise direction in FIG. 16 about the center of the shaft 414 by using the motor 412 which is controlled by the main control unit 182.

When the empty spool holder is stopped at the first station ST1 in accordance with the rotation of the spool turret 416, the spool 16, which is supplied from the winding section 106, is set to the spool holder. When the spool holder, which holds the spool 16, is stopped at the second station ST2 in accordance with the rotation of the spool turret 416, the appearance (bending, breakage) of the spool 16 is firstly inspected by the appearance inspection station 420. Only the spool 16, which is decided to be good, is subjected to the positioning for the direction of the slit 24 by the aid of the spool-positioning section 422.

When the spool 16, which has been subjected to the positioning for the direction of the slit 24, is transported to the third station ST3, the photographic film strip 18 and the shield paper strip 20 are wound around the spool 16 at the third station ST3.

Specifically, in the case of the shield paper strip 20 corresponding to the full size, the forward end (rearward end in the product form) of the lengthy shield paper sheet 360 transported by the transport roller pair 386 is inserted into the slit 24. When the forward end of the lengthy shield paper sheet 360 is inserted into the slit 24, the lengthy shield paper sheet 360 is cut by the shield paper cutter 398 to give the shield paper strip 20 corresponding to the full size. In this state, the winding mechanism 424 rotates the spool 16 to make several turns in the winding direction to wind the rearward end 20*b* of the shield paper strip 20 around the spool 16.

On the other hand, in the case of the shield paper strip 20 corresponding to the half size, the forward end 20*a* (rearward end 20*b* in the product form) of the shield paper strip 20 corresponding to the half size transported by the transport roller pair 386 is inserted into the slit 24. In this state, the winding mechanism 424 rotates the spool 16 to make several turns in the winding direction to wind the rearward end 20*b* of the shield paper strip 20 around the spool 16.

When the shield paper strip 20 is slightly wound around the spool 16, the photographic film strip 18 is transported from the branched line 316 by the aid of the third transport roller pair 340*c*. The photographic film strip 18 is superimposed on the back surface of the shield paper strip 20.

In this state, the winding mechanism 424 further rotates the spool 16 in the winding direction to wind all of the shield paper strip 20 and the photographic film strip 18 around the spool 16. During this process, the adhesive tape 32, which is glued to the rearward end of the photographic film strip 18, is stuck to the back surface of the shield paper strip 20 to fix the photographic film strip 18 to the shield paper strip 20.

The spool 16, around which the photographic film strip 18 and the shield paper strip 20 are wound in the third station ST3, is transported to the next fourth station ST4 in accordance with the rotation of the spool turret 416, while being held not to cause any winding looseness of the shield paper strip 20. In the fourth station ST4, the forward end 20*a* of the shield paper strip 20 is folded inwardly by the folding section 426.

In the fifth station ST5, the seal-winding section 428 draws the opening seal 36 from the roll 430. The opening seal 36 is cut to have the predetermined width to be wound around the outer circumference of the shield paper strip 20.

The serial number is printed by the print head 436 on the opening seal 36 during the transport from the roll 430 to the seal-winding section 428 on the basis of the print data inputted from the sixth auxiliary control unit 410. The printing data is obtained such that the serial number, which is the production information inputted into the main control unit 182, is converted into the printing data by the sixth auxiliary control unit 410.

The product name, which is the film information of the opening seal 36, is photographed by the CCD camera 438 during the process between the printing of the serial number and the winding to the shield paper strip 20. The photographed image data, which is photographed by the CCD camera 438, is inputted into the sixth auxiliary control unit 410. The sixth auxiliary control unit 410 converts the inputted photographed image data into the character data. The film information corresponding to the character data is inputted into the main control unit 182.

The photographic film strip 18, which is completed by winding the opening seal 36 therearound, is transported to the sixth station ST6 in accordance with the rotation of the spool turret 416. In the sixth station ST6, the thickness of the winding diameter is measured by the winding diameter-measuring section 444. The measurement result is inputted from the sixth auxiliary control unit 410 to the main control unit 182, and it is stored. The operation for measuring the winding diameter by the winding diameter-measuring section 444 may be performed after being discharged from the seventh station ST7.

The main control unit 182 collates the film information and the production information previously inputted for the side print and the printing with the appropriately inputted film information read by the respective sections. The collation result is stored by the main control unit 182. If the collation result is inconsistent, the main control unit 182 gives the alarm to the operator, and it displays the collation result on a display or the like. The operator confirms the contents of the display to once stop the production apparatus 100 so that, for example, any erroneously supplied constitutive component is exchanged.

If the photographic roll film 10 transported to the sixth station ST6 is defective, or if the collation result for the film information and the production information is inconsistent, or if both of the above cases occur, then the photographic roll film 10 is taken out of the spool holder 418, and it is discharged to the outside of the production apparatus 100.

The photographic roll film 10, for which it has been confirmed that the collation result of the film information and the production information is consistent, is subjected to the measurement of the winding diameter in the seventh station ST7. If the winding diameter is within a prescribed value, then the photographic roll film 10 is fed to the stacking section 446, and it is transported to the next packaging apparatus or the like. If the winding diameter is without the prescribed value, then the photographic roll film 10 is taken out of the spool holder 418, and it is discharged to the outside of the production apparatus 100. In the eighth station ST8, remained matters of the product and the spool 16 are detected.

As described above, if there is any inconsistency in the information on the respective constitutive components, then the alarm is given, and the photographic roll film 10 produced by using any erroneous constitutive component is not shipped. Therefore, it is possible to maintain the reliability of the product.

Alternatively, the photographic roll film 10 may be also produced by controlling the production apparatus 100 according to the embodiment of the present invention as follows.

That is, the production information and the film information for the side print on the lengthy photographic film 110 are inputted into the main control unit 182 separately from the production information for the printing on the opening seal 36. The main control unit 182 is used to make collation for the pieces of information described above. If the pieces of information are inconsistent, the main control unit 182 urges the operator to input correct information again.

If the pieces of information are coincident with each other, the production apparatus 100 is operated to produce the photographic roll film 100 in the same manner as in the production apparatus 100 according to the embodiment described above. The film information on the respective constitutive components is read during the production. The main control unit 182 is used to collate the inputted information with the read information in the same manner as described above.

If the collation result is inconsistent, the main control unit 182 gives the alarm to the operator, and it displays the collation result on a display or the like. The photographic roll film 10, which is produced with any erroneous constitutive component, is discharged to the outside of the production apparatus 100 by the aid of the selecting mechanism 442 in the sixth station ST6.

The photographic roll film 10, for which it has been confirmed that the collation result of the film information and the production information is consistent, is fed to the stacking section 446 from the seventh station ST7, and it is transported to the next packaging apparatus or the like.

In the production apparatus 100 concerning this embodiment, the information inputted into the main control unit 182 is firstly subjected to the collation, and the production is started after confirming the coincidence. Therefore, it is possible to decrease the probability of inconsistency of the information during the production. Thus, it is possible to maintain the reliability of the product.

As described above, the production apparatus 100 according to the embodiment of the present invention is provided with the film-cutting means (suction drum 146, origin signal-generating means 210, start signal-generating means 260, transport belt 150, and film cutter 148) for cutting the lengthy photographic film 110 fed from the film roll 116A or 116B into those having the length suitable for the film size included in the film information; the transport operation-changing means (conveyer apparatus 312) for changing the transport operation for the photographic film strip 18 depending on the film size; the timing-changing means (first to third transport roller pairs 340a to 340c and first and second optical sensors 346, 348) for changing the transport timing depending on the film size for the photographic film strip 18 to be transported to the winding section 106; and the timing-changing means (optical sensor 402) for changing the transport timing depending on the film size for the shield paper strip 20 to be transported to the winding section 106. Therefore, it is easy to produce the photographic roll films 10 concerning the two or more sizes in the switching manner. Thus, it is possible to realize the small scale of the production equipment, reduce the installation space, and reduce the production cost.

It is a matter of course that the apparatus and the method for producing photographic roll films according to the present invention are not limited to the embodiments described above, which may be embodied in other various forms without deviating from the gist or essential characteristics of the present invention.

What is claimed is:

1. An apparatus for producing photographic roll films, comprising a film supply section for supplying a photographic film strip, a shield paper supply section for supplying a shield paper strip, a winding section for winding said photographic film strip and said shield paper strip around a spool, and a transport system for transporting said photographic film strip to said winding section, wherein:
said film supply section includes a film-cutting means for cutting a lengthy photographic film fed from a film roll into those having a length suitable for a film size included in film information to give said photographic film strip;
said apparatus further comprises a transport operation-changing means for changing transport operation for said photographic film strip depending on said film size, between said film supply section and said transport system for said photographic film strip; and
said apparatus further comprises a timing-changing means for changing transport timing depending on said film size, for said transport system for said photographic film strip and a transport system for said shield paper strip.

2. The apparatus for producing said photographic roll films according to claim 1, wherein said film-cutting means cuts said lengthy photographic film on the basis of a start signal corresponding to said film size supplied from a start signal-generating means to give a photographic film strip having a length suitable for a current film size.

3. The apparatus for producing said photographic roll films according to claim 2, wherein said start signal-generating means includes:
an origin signal-generating means for generating a plurality of origin signals corresponding to said film sizes; and
a selector section for selecting an origin signal corresponding to said current film size, of said plurality of origin signals supplied from said origin signal-generating means so that said selected origin signal is outputted as a start signal.

4. The apparatus for producing said photographic roll films according to claim 3, wherein said origin signal-generating means includes:
a power transmission mechanism for being driven by a driving source of a driving motor for a suction drum for transporting said lengthy photographic film supplied from said film roll while allowing said lengthy photographic film to make tight contact by the aid of suction of air;
said power transmission mechanism being operated such that driving force of said driving motor is transmitted to each of circular plates of a number corresponding to types of said film size to be included in said film information so that each of said corresponding circular plates is rotated to make one turn when said lengthy photographic film is transported in an amount of a length corresponding to each said film sizes; and
sensors attached to said respective circular plates, each of which outputs a detection signal when each of said corresponding circular plates is rotated to make one turn.

5. The apparatus for producing said photographic roll films according to claim 1, wherein said transport operation-changing means changes said transport operation for said photographic film strip so that low speed transport for said photographic film strip is performed only when said photographic film strip is cut, irrelevant to said film size.

6. The apparatus for producing said photographic roll films according to claim 5, wherein:
said transport operation-changing means includes at least two conveyer apparatuses;
a length of said upstream side conveyer apparatus of said conveyer apparatuses is set to be substantially the same as a length of said shortest photographic film strip; and
a total length of said conveyer apparatuses for constructing said transport operation-changing means is substantially the same as a length of said longest photographic film strip.

7. The apparatus for producing said photographic roll films according to claim 6, wherein:
each of said conveyer apparatuses is of a type to transport said photographic film strip while nipping it with an upper conveyer and a lower conveyer; and
a downstream side roller of said upper conveyer of said upstream side conveyer apparatus is positioned over an upstream side roller of said lower conveyer of said downstream side conveyer apparatus.

8. The apparatus for producing said photographic roll films according to claim 1, wherein said timing-changing means includes:
a first sensor installed in said transport system for said photographic film strip, for detecting a forward end of said photographic film strip irrelevant to said film size to output a signal to facilitate once-stop;
a second sensor installed in said transport system for said photographic film strip, for detecting a forward end of said shortest photographic film strip to output a signal to facilitate once-stop;
a cutter installed in said transport system for said shield paper strip to be fed to said winding section, for once-stopping said shield paper strip to cut it into those having a prescribed length; and
a sensor installed in said transport system for said shield paper strip, for detecting a forward end inclined section of said shield paper strip corresponding to said shortest photographic film strip to output a signal to facilitate once-stop.

9. The apparatus for producing said photographic roll films according to claim 1, wherein an appearance-inspecting means for inspecting appearance of said spool is installed in a station (ST2) disposed at an upstream stage of a station (ST3) for winding said photographic film strip and said shield paper strip around said spool, of a plurality of stations (ST1 to ST8) for constructing said winding section.

10. The apparatus for producing said photographic roll films according to claim 1, wherein a heat block for thermal gluing, which is exchangeable depending on said film size, is installed at a seal-winding section for winding an opening seal around an outer circumference of said shield paper strip wound around said spool.

11. An apparatus for producing photographic roll films, comprising a film supply section for supplying a photographic film strip, a shield paper supply section for supplying a shield paper strip, a winding section for winding said photographic film strip and said shield paper strip around a spool, and a transport system for transporting said photographic film strip to said winding section, wherein:
said film supply section includes a feed control apparatus for a lengthy photographic film as an original sheet for said photographic film strip, and said feed control apparatus includes:
a rotation control means for calculating a winding diameter of a film roll on the basis of a number of revolution of a driving motor obtained when said lengthy photographic film is fed in a predetermined length corresponding to a preset film size from said film roll with said lengthy photographic film wound therearound, and calculating a number of revolution to be used to feed said lengthy photographic film in said predetermined length within a predetermined period of time on the basis of said winding diameter so that said number of revolution is used as a corrected number of revolution; and a motor control means for making feedback control so that said number of revolution of said driving motor is changed to said corrected number of revolution within a predetermined period of time, while comparing said corrected number of revolution supplied from said rotation control means with a current number of revolution of said driving motor.

12. The apparatus for producing said photographic roll films according to claim 11, wherein said rotation control means includes:

a winding diameter-calculating means for calculating said winding diameter of said film roll on the basis of said number of revolution of said driving motor when said lengthy photographic film is fed in said predetermined length from said film roll; and a number of revolution-correcting means for calculating said number of revolution for said lengthy photographic film to be fed in said predetermined length within said predetermined period of time on the basis of winding diameter information fed from said winding diameter-calculating means to make output as said corrected number of revolution.

13. The apparatus for producing said photographic roll films according to claim 12, wherein said winding diameter-calculating means includes:

a number of revolution-detecting means for detecting said number of revolution of said driving motor for driving and rotating said film roll;

a feed amount-detecting means for detecting a feed amount of said lengthy photographic film from said film roll effected by said rotary driving of said motor;

a film length-detecting section for comparing information fed from said feed amount-detecting means with said predetermined length to measure a period of time during which said lengthy photographic film is fed in said predetermined length;

a number of revolution-counting section for counting said number of revolution of said motor over said period of time of said measurement performed by said film length-detecting section; and a winding diameter-calculating section for calculating a current winding diameter of said film roll on the basis of a counted value fed from said number of revolution-counting section and a value corresponding to said predetermined length.

14. The apparatus for producing said photographic roll films according to claim 13, wherein said number of revolution-detecting means includes an encoder for making conversion and output of an electric signal having a number of pulses corresponding to said number of revolution of said driving motor, or a sensor for outputting a detection signal when a circular plate attached to a driving shaft is rotated to make one turn.

15. The apparatus for producing said photographic roll films according to claim 13, further comprising:

a roller for guiding said lengthy photographic film fed from said film roll to a transport line disposed at a downstream stage, wherein:

said feed amount-detecting means is an encoder for making conversion and output of an electric signal having a number of pulses corresponding to said number of revolution of said roller.

16. The apparatus for producing said photographic roll films according to claim 13, further comprising:

a dancer roller for absorbing feed of said lengthy photographic film caused by transport stop of said lengthy photographic film as a result of cutting of said lengthy photographic film, wherein:

said feed amount-detecting means is an electronic component for making conversion and output of an electric signal having a level corresponding to a movement distance of said dancer roller.

17. An apparatus for producing photographic roll films, comprising a film supply section for supplying a photographic film strip, a shield paper supply section for supplying a shield paper strip, a winding section for winding said photographic film strip and said shield paper strip around a spool, and a transport system for transporting said photographic film strip to said winding section, wherein:

said apparatus further comprises a printing apparatus for printing various information on said photographic film strip; and a start signal-generating means for generating a start signal corresponding to a film size, and for outputting said start signal to said printing apparatus, said start signal-generating means including a register, a signal generating section, and a selector section, wherein said register stores film size classification information and associated attributes of a selection signal, said signal generating section changes the attributes of a selection signal on the basis of film size, and said selector section selects an origin signal corresponding to the attributes of the selection signal and outputs a start signal, and further wherein said printing apparatus starts printing on the basis of said start signal, and it performs printing on said photographic film strip in accordance with inputted printing data.

18. An apparatus for producing photographic roll films, comprising a film supply section for supplying a photographic film strip, a shield paper supply section for supplying a shield paper strip, a winding section for winding said photographic film strip and said shield paper strip around a spool, and a transport system for transporting said photographic film strip to said winding section, wherein:

said apparatus further comprises a printing apparatus for printing various information on said photographic film strip; and said printing apparatus starts printing on the basis of input of a start signal corresponding to a film size fed from a start signal-generating means, and it performs printing on said photographic film strip in accordance with inputted printing data, and further wherein said start signal-generating means includes:

an origin signal-generating means for generating a plurality of origin signals corresponding to said film sizes; and a selector section for selecting an origin signal corresponding to a current film size, of said plurality of origin signals supplied form said origin signal-generating means so that said selected origin signal is outputted as a start signal.

19. The apparatus for producing said photographic roll films according to claim 18, wherein said origin signal-generating means includes:

a power transmission mechanism for being driven by a driving source of a driving motor for a suction drum for transporting said photographic film strip while allowing said photographic film strip to make tight contact by the aid of suction of air;

said power transmission mechanism being operated such that driving force of said driving motor is transmitted to each of circular plates of a number corresponding to types of said film size to be included in said film information so that each of said corresponding circular plates is rotated to make one turn when said photographic film strip is transported in an amount of a length corresponding to each said film sizes; and sensors attached to said respective circular plates, each of which outputs a detection signal when each of said corresponding circular plates is rotated to make one turn.

20. The apparatus for producing said photographic roll films according to claim 19, wherein said origin signal-generating means includes a first origin signal-generating means for generating a first origin signal for a full size, and a second origin signal-generating means for generating a second origin signal for a half size.

21. The apparatus for producing said photographic roll films according to claim 20, wherein said first origin signal-generating means includes:

a first pulley fixed to a rotary shaft of said driving motor for rotating and driving said suction drum;

a second pulley to which rotary driving of said first pulley is transmitted by the aid of a belt; and said first circular plate for making rotation together with said second pulley.

22. The apparatus for producing said photographic roll films according to claim 20, wherein said second origin signal-generating means includes:

a third pulley fixed to a rotary shaft of said driving motor for rotating and driving said suction drum;

a fourth pulley to which rotary driving of said third pulley is transmitted by the aid of a belt; and said second circular plate for making rotation together with said fourth pulley.

23. The apparatus for producing said photographic roll films according to claim 18, wherein said origin signal-generating means includes:

a first decelerator having an input/output ratio of full size film length/full size film length coupled to a rotary shaft of a driving motor of a suction drum;

a second decelerator having an input/output ratio of full size film length/full size film length coupled to said first decelerator via a belt drive system;

a second circular plate coupled to a rotary shaft of said second decelerator;

a third decelerator having an input/output ratio of full size film length/half size film length coupled to said second circular plate; and a first circular plate coupled to a rotary shaft of said third decelerator.

24. An apparatus for producing photographic roll films, comprising a film supply section for supplying a photographic film strip, a shield paper supply section for supplying a shield paper strip, a winding section for winding said photographic film strip and said shield paper strip around a spool, and a transport system for transporting said photographic film strip to said winding section, wherein:

said apparatus further comprises a transport apparatus for sticking a tape member to said photographic film strip;

said transport apparatus includes a plurality of transport roller pairs corresponding to types of film sizes, installed at a transport passage disposed at a downstream stage of a tape-sticking section for sticking said tape; and said apparatus further comprises a control means for making control to successively select a plurality of present transport roller pairs of said plurality of transport roller pairs corresponding to said film size so that any one of said transport roller pair of said plurality of successively selected transport rollers pairs is used to transport said photographic film strip.

25. The apparatus for producing said photographic roll films according to claim 24, wherein:

first to third transport roller pairs are installed corresponding to a full size and a half size of said photographic film strip;

when said photographic film strip to be stuck with said tape is of said full size, said control means successively selects said first transport roller pair disposed nearest to said tape-sticking section and said third transport roller pair disposed furthest from said tape-sticking section depending on a transport state of said photographic film strip to make control such that said photographic film strip is transported by any one of said transport roller pair of said first and third transport roller pairs; and when said photographic film strip to be stuck with said tape is of said half size, said control means successively selects said first to third transport roller pairs depending on a transport state of said photographic film strip to make control such that said photographic film strip is transported by any one of said transport roller pair of said first to third transport roller pairs.

26. The apparatus for producing said photographic roll films according to claim 25, further comprising:

a first sensor installed in the vicinity of said third transport roller pair, for detecting a forward end of said photographic film strip irrelevant to said film size to output a signal to facilitate once-transport stop; and a second sensor installed in the vicinity of said second transport roller pair, for detecting a forward end of said photographic film strip of said half size to output a signal to facilitate once-transport stop, wherein:

said tape-sticking section sticks said tape member to said photographic film strip, i.e., to said photographic film strip of said full size on the basis of said output of said signal from said first sensor, or to said photographic film strip of said half size on the basis of said output of said signal from said second sensor.

27. A method for producing photographic roll films by winding a photographic film strip fed from a film supply section and a shield paper strip fed from a shield paper supply section around a spool while superimposing said photographic film strip and said shield paper strip to produce said photographic roll film; said method comprising:

a cutting process for cutting a lengthy photographic film fed from a film roll into those having a length suitable for a film size included in film information;

a transport operation-changing process for changing transport operation for said photographic film strip after said cutting depending on said film size; and a transport timing-changing process for changing transport timing for said photographic film strip and transport timing for said shield paper strip depending on said film size.

28. The method for producing said photographic roll films according to claim 27, wherein said cutting process is performed such that said lengthy photographic film is cut on the basis of a start signal corresponding to said film size to obtain said photographic film strip having a length suitable for a current film size.

29. The method for producing said photographic roll films according to claim 28, wherein said start signal is based on an origin signal corresponding to said current film size, of a plurality of origin signals corresponding to said film sizes.

30. The method for producing said photographic roll films according to claim 29, wherein driving force of a driving motor for a suction drum, which is used to transport said lengthy photographic film fed from said film roll while making tight contact by the aid of suction of air, is transmitted to circular plates of a number corresponding to types of said film sizes included in said film information, each of said corresponding circular plates is rotated to make one turn when said lengthy photographic film is transported in a length of each of said corresponding film sizes, and said start signal is outputted when each of said circular plate is rotated to make one turn.

31. The method for producing said photographic roll films according to claim 27, wherein said transport operation for said photographic film strip is changed in said transport operation-changing process so that low speed transport is performed for said photographic film strip only when said photographic film strip is cut, irrelevant to said film size.

32. The method for producing said photographic roll films according to claim 27, wherein said transport timing-changing process includes:
 a photographic film strip transport stop process for detecting a forward end of said photographic film strip to facilitate once-stop irrelevant to said film size and detecting a forward end of said shortest photographic film strip to facilitate once-stop; and
 a shield paper stop process for once-stopping said shield paper strip to cut it into those having a prescribed length, and detecting a forward end inclined section of said shield paper strip corresponding to said shortest photographic film strip to facilitate once-stop.

33. The method for producing said photographic roll films according to claim 27, wherein appearance of said spool is inspected before performing a process for winding said photographic film strip and said shield paper strip around said spool.

34. The method for producing said photographic roll films according to claim 27, wherein a heater block for thermal adhesion, which is exchangeable depending on said film size, is used for a seal-winding process for winding an opening seal around outer circumference of said shield paper strip wound around said spool.

35. A method for producing photographic roll films by winding a photographic film strip fed from a film supply section and a shield paper strip fed from a shield paper supply section around a spool while superimposing said photographic film strip and said shield paper strip to produce said photographic roll film; said method comprising:
 feeding said photographic film strip from said film supply section, wherein:
  a winding diameter of a film roll is calculated on the basis of a number of revolution of a driving motor when a lengthy photographic film is fed in a predetermined length corresponding to a preset film size from said film roll wound with said lengthy photographic film as an original sheet of said photographic film strip;
  a number of revolution is calculated on the basis of said winding diameter to obtain a corrected number of revolution with which said lengthy photographic film is to be fed in said predetermined length within a predetermined period of time; and
  feedback control is made so that said number of revolution of said driving motor becomes said corrected number of revolution within a predetermined period of time while comparing said corrected number of revolution with a current number of revolution of said driving motor.

36. The method for producing said photographic roll films according to claim 35, wherein said process for obtaining said corrected number of revolution includes:
 a process for calculating said winding diameter of said film roll on the basis of said number of revolution of said driving motor when said lengthy photographic film is fed in said predetermined length from said film roll; and
 a process for calculating said number of revolution for said lengthy photographic film to be fed in said predetermined length within said predetermined period of time on the basis of said winding diameter to give said corrected number of revolution.

37. The method for producing said photographic roll films according to claim 36, wherein said process for obtaining said winding diameter includes:
 a process for detecting said number of revolution of said driving motor for driving and rotating said film roll;
 a process for detecting a feed amount of said lengthy photographic film from said film roll effected by said rotary driving of said driving motor;
 a process for comparing said feed amount with said predetermined length to measure a period of time during which said lengthy photographic film is fed in said predetermined length;
 a process for counting said number of revolution of said driving motor over said period of time of said measurement; and
 a process for calculating a current winding diameter of said film roll on the basis of an obtained counted value and a value corresponding to said predetermined length.

38. The method for producing said photographic roll films according to claim 37, wherein said process for detecting said number of revolution of said driving motor is performed by using an encoder for making conversion and output of an electric signal having a number of pulses corresponding to said number of revolution of said driving motor, or a sensor for outputting a detection signal when a circular plate attached to a driving shaft is rotated to make one turn.

39. The method for producing said photographic roll films according to claim 37, wherein said process for detecting said feed amount of said lengthy photographic film from said film roll is performed by using:
 a roller for guiding said lengthy photographic film fed from said film roll to a transport line disposed at a downstream stage; and
 an encoder for making conversion and output of an electric signal having a number of pulses corresponding to said number of revolution of said roller.

40. The method for producing said photographic roll films according to claim 37, wherein said process for detecting said feed amount of said lengthy photographic film from said film roll is performed by using:
 a dancer roller for absorbing feed of said lengthy photographic film caused by transport stop of said photographic film strip as a result of cutting of said lengthy photographic film; and
 an electronic component for making conversion and output of an electric signal having a level corresponding to a movement distance of said dancer roller.

41. A method for producing photographic roll films by winding a photographic film strip fed from a film supply section and a shield paper strip fed from a shield paper supply section around a spool while superimposing said photographic film strip and said shield paper strip to produce said photographic roll film, said method comprising:

generating a start signal corresponding to a film size by retrieving film size classification information and associated attributes of a selection signal, changing the attributes of said selection signal on the basis of film size, and selecting an origin signal corresponding to the attributes of the selection signal; and a photographic film printing process for printing various information on said photographic film strip, wherein:
said photographic film printing process is executed such that printing is started on the basis of input of said start signal, and printing is performed on said photographic film strip in accordance with inputted printing data.

42. A method for producing said photographic roll films by winding a photographic film strip fed from a film supply section and a shield paper strip fed from a shield paper supply section around a spool while superimposing said photographic film strip and said shield paper strip to produce said photographic roll film, said method comprising:

a photographic film printing process for printing various information on said photographic film strip, wherein:
said photographic film printing process is executed such that printing is started on the basis of input of a start signal corresponding to a film size, and printing is performed on said photographic film strip in accordance with inputted printing data, and
further wherein said start signal is generated by selecting an origin signal corresponding to a current film size, of a plurality of origin signals generated in conformity with said film size.

43. The method for producing said photographic roll films according to claim 42, wherein said origin signal is generated such that:

a driving motor for a suction drum, which is used to transport said photographic film strip while allowing said photographic film strip to make tight contact by the aid of suction of air, is used as a driving source;

driving force of said driving motor is transmitted to each of circular plates of a number corresponding to types of said film size to be included in said film information;

each of said corresponding circular plates is rotated to make one turn when said photographic film strip is transported in an amount of a length corresponding to each said film sizes; and detection is made for the fact that each of said corresponding circular plates is rotated to make one turn.

44. A method for producing photographic roll films by winding a photographic film strip fed from a film supply section and a shield paper strip fed from a shield paper supply section around a spool while superimposing said photographic film strip and said shield paper strip to produce said photographic roll film, wherein:

said method comprises a tape-sticking transport process for sticking a tape member to said photographic film strip;

said tape-sticking transport process includes using a plurality of transport roller pairs corresponding to types of film sizes, installed at a transport passage disposed at a downstream stage of a tape-sticking section for sticking said tape; and control is made to successively select a plurality of preset transport roller pairs of said plurality of transport roller pairs corresponding to said film size so that any one of said transport roller pair of said plurality of successively selected transport roller pairs is used to transport said photographic film strip.

45. The method for producing said photographic roll films according to claim 44, wherein:

first to third transport roller pairs installed corresponding to a full size and a half size of said photographic film strip are used;

when said photographic film strip to be stuck with said tape is of said full size, said first transport roller pair disposed nearest to said tape-sticking section and said third transport roller pair disposed furthest from said tape-sticking section are successively selected depending on a transport state of said photographic film strip to make control such that said photographic film strip is transported by any one of said transport roller pair of said first to third transport roller pairs; and when said photographic film strip to be stuck with said tape is of said half size, said first to third transport roller pairs are successively selected depending on a transport state of said photographic film strip to make control such that said photographic film strip is transported by any one of said transport roller pair of said first to third transport roller pairs.

46. The method for producing said photographic roll films according to claim 45, further comprising using:

a first sensor installed in the vicinity of said third transport roller pair, for detecting a forward end of said photographic film strip irrelevant to said film size to output a signal to facilitate once-transport stop; and a second sensor installed in the vicinity of said second transport roller pair, for detecting a forward end of said photographic film strip of said half size to output a signal to facilitate once-transport stop, wherein:

said tape member is stuck to said photographic film strip, i.e., to said photographic film strip of said full size on the basis of said output of said signal from said first sensor, or to said photographic film strip of said half size on the basis of said output of said signal from said second sensor.

* * * * *